US011807208B2

(12) United States Patent
Van Thiel

(10) Patent No.: US 11,807,208 B2
(45) Date of Patent: *Nov. 7, 2023

(54) INTEGRATED TRAILER CONTROL MODULE WITH EXTERNAL ELECTRO-PNEUMATIC PARKING BRAKE UNIT

(71) Applicant: WABCO GmbH, Hannover (DE)

(72) Inventor: Julian Van Thiel, Hannover (DE)

(73) Assignee: ZF CV Systems Europe BV, Brussels (BE)

(*) Notice: Subject to any disclaimer, the term of this patent is extended or adjusted under 35 U.S.C. 154(b) by 435 days.

This patent is subject to a terminal disclaimer.

(21) Appl. No.: 16/494,357

(22) PCT Filed: Mar. 20, 2018

(86) PCT No.: PCT/EP2018/056995
§ 371 (c)(1),
(2) Date: Sep. 16, 2019

(87) PCT Pub. No.: WO2018/172340
PCT Pub. Date: Sep. 27, 2018

(65) Prior Publication Data
US 2020/0047730 A1 Feb. 13, 2020

(30) Foreign Application Priority Data

Mar. 21, 2017 (DE) ..................... 10 2017 002 953.9
Jun. 24, 2017 (DE) ..................... 10 2017 005 980.2

(51) Int. Cl.
*B60T 8/36* (2006.01)
*B60T 8/17* (2006.01)
*B60T 15/02* (2006.01)

(52) U.S. Cl.
CPC ............ *B60T 8/362* (2013.01); *B60T 8/1708* (2013.01); *B60T 15/027* (2013.01)

(58) Field of Classification Search
CPC ...... B60T 13/683; B60T 8/1708; B60T 8/361; B60T 8/362; B60T 8/027; B60T 15/36;
(Continued)

(56) References Cited

U.S. PATENT DOCUMENTS 4,372,620 A * 2/1983 Mekosh, Jr. .............. B60T 8/74
303/127
4,671,578 A * 6/1987 Rothen ..................... B60T 8/00
303/15

(Continued)

FOREIGN PATENT DOCUMENTS

CN 101970270 A * 2/2011 .............. B60T 13/04
DE 10320608 A1 12/2004
(Continued)

OTHER PUBLICATIONS

English translation of DE102012000435A1 (Year: 2012).*
(Continued)

*Primary Examiner* — Robert A. Siconolfi
*Assistant Examiner* — Mahbubur Rashid
(74) *Attorney, Agent, or Firm* — Dickinson Wright PLLC

(57) ABSTRACT

An electropneumatic trailer control module (1) for an electronically controllable pneumatic brake system (520) for a vehicle combination (500) with a tractor vehicle (502) and a trailer vehicle (504), has an electronic control unit (ECU), a pneumatic reservoir input (11), a trailer control valve unit (65) with electropneumatic valves (RV, IV, OV), a trailer brake pressure port (22), and a trailer supply pressure port (21). The electronic control unit (ECU) has a parking brake signal input (200) for receiving an electronic brake representation signal (SB1, SB2, SB3) for an immobilizing brake (6, 532a, 532b) of the tractor vehicle (502) and is configured to, on the basis of the brake representation signal (SB1, SB2, SB3), switch at least one of the one or more electropneu-
(Continued)

matic valves (RV, IV, OV) of the trailer control valve unit (65) in order to output a brake pressure.

30 Claims, 11 Drawing Sheets

(58) Field of Classification Search
CPC ...... B60T 8/327; B60T 13/263; B60T 8/1887; B60T 8/3675
See application file for complete search history.

(56) References Cited

U.S. PATENT DOCUMENTS

| | | | | |
|---|---|---|---|---|
| 5,042,883 | A * | 8/1991 | McCann | B60T 13/58 303/7 |
| 5,061,015 | A * | 10/1991 | Cramer | B60T 13/683 303/7 |
| 5,090,780 | A * | 2/1992 | Powell | B60T 13/665 303/15 |
| 5,443,306 | A * | 8/1995 | Broome | B60T 8/327 303/3 |
| 5,581,023 | A * | 12/1996 | Handfield | B60C 23/0408 73/146.5 |
| 7,517,026 | B1 * | 4/2009 | Herbst | B60T 7/20 303/113.4 |
| 8,702,179 | B2 * | 4/2014 | Beier | B60T 13/263 701/33.9 |
| 9,327,694 | B2 * | 5/2016 | Klostermann | B60T 11/108 |
| 2003/0111902 | A1 * | 6/2003 | Thiede | B60T 7/22 303/193 |
| 2004/0012249 | A1 * | 1/2004 | Koelzer | B60G 17/0523 303/3 |
| 2005/0029859 | A1 * | 2/2005 | Bensch | B60T 13/68 303/89 |
| 2007/0262637 | A1 * | 11/2007 | Bennett | B60T 13/662 303/3 |
| 2008/0030068 | A1 * | 2/2008 | Bensch | B60T 13/588 303/17 |
| 2009/0184568 | A1 * | 7/2009 | Bensch | B60T 8/327 303/115.2 |
| 2009/0256416 | A1 * | 10/2009 | Bensch | B60T 17/22 303/17 |
| 2009/0309413 | A1 * | 12/2009 | Bensch | B60T 17/04 303/20 |
| 2010/0025141 | A1 * | 2/2010 | Bensch | B60T 8/327 180/271 |
| 2010/0066161 | A1 * | 3/2010 | Fry | B60T 7/20 303/9.66 |
| 2010/0072810 | A1 * | 3/2010 | Bensch | B60T 17/228 303/17 |
| 2010/0078988 | A1 * | 4/2010 | Bensch | B60T 13/04 303/3 |
| 2010/0237690 | A1 * | 9/2010 | Forster | B60T 13/263 303/13 |
| 2010/0252378 | A1 * | 10/2010 | Hilberer | B60T 13/683 188/106 F |
| 2011/0012421 | A1 * | 1/2011 | Bensch | B60T 8/1708 303/115.2 |
| 2011/0147142 | A1 * | 6/2011 | Standen | B62D 53/10 188/152 |
| 2012/0319464 | A1 * | 12/2012 | Lloyd | B60T 8/1708 303/3 |
| 2013/0086898 | A1 * | 4/2013 | Yang | B60T 7/042 60/413 |
| 2013/0221735 | A1 * | 8/2013 | Kiel | B60T 8/1708 701/70 |
| 2015/0012199 | A1 * | 1/2015 | Mederer | B60T 8/1708 701/70 |
| 2015/0094906 | A1 * | 4/2015 | Greene | B60T 13/263 701/33.9 |
| 2015/0239441 | A1 * | 8/2015 | Klostermann | B60T 15/028 303/7 |
| 2015/0344011 | A1 * | 12/2015 | Casali | B60T 15/18 303/7 |
| 2017/0137003 | A1 * | 5/2017 | Grandstaff | B60T 8/1708 |
| 2017/0174197 | A1 * | 6/2017 | Eberling | B60T 13/662 |
| 2018/0029570 | A1 * | 2/2018 | Schick | B60T 13/581 |
| 2018/0029571 | A1 * | 2/2018 | Schick | B60T 13/12 |
| 2018/0251112 | A1 * | 9/2018 | Griesser | B60T 17/004 |
| 2018/0273014 | A1 * | 9/2018 | Boulivan | B60T 13/14 |

FOREIGN PATENT DOCUMENTS

| | | | | |
|---|---|---|---|---|
| DE | 102004051309 | A1 | 5/2006 | |
| DE | 102007014423 | A1 | 9/2008 | |
| DE | 102008014458 | A1 | 9/2009 | |
| DE | 102012000435 | A1 | 7/2013 | |
| DE | 102012105136 | A1 | 12/2013 | |
| DE | 102014108681 | B3 | 4/2015 | |
| DE | 102016003034 | A1 | 9/2016 | |
| DE | 102015112490 | A1 | 2/2017 | |
| DE | 102017005979 | A1 * | 9/2018 | ............ B60T 13/263 |
| EP | 2615003 | A1 * | 7/2013 | ............ B60T 13/662 |
| EP | 2615003 | A1 | 7/2013 | |
| EP | 2821303 | A1 * | 1/2015 | ............ B60T 15/041 |
| EP | 3112231 | A1 * | 1/2017 | ............ B60T 13/385 |
| WO | WO-2008113591 | A2 * | 9/2008 | ............ B60T 13/263 |
| WO | WO-2011015831 | A1 * | 2/2011 | ............ B60T 13/683 |
| WO | WO-2012140002 | A3 * | 4/2013 | ............ B60T 17/083 |
| WO | 2016177475 | A1 | 11/2016 | |
| WO | WO-2018172394 | A1 * | 9/2018 | ............. B60T 7/042 |

OTHER PUBLICATIONS

WO-2015154788 A1 (Year: 2015).*
European Patent Office, Rijswijk, Netherlands, International Search Report of International Application No. PCT/EP2018/056995, dated Jun. 28, 2018, 2 pages.

* cited by examiner

INTEGRATED TRAILER CONTROL MODULE WITH EXTERNAL ELECTRO-PNEUMATIC PARKING BRAKE UNIT

TECHNICAL FIELD

The invention relates to an electropneumatic trailer control module for an electronically controllable pneumatic brake system for a vehicle combination with a tractor vehicle and a trailer vehicle, having an electronic control unit, a pneumatic reservoir input, which is connectable to a compressed-air reservoir, a trailer control valve unit with one or more electropneumatic valves, a trailer brake pressure port, and a trailer supply pressure port. The invention furthermore relates to a vehicle combination having an electropneumatic trailer control module of the above generic type.

BACKGROUND

In vehicles, in particular utility vehicles, having a pneumatic brake system formed in particular as an electronic brake system (EBS) or anti-lock system (ABS), for the outputting of brake pressures, electropneumatic valves, for example relay valves or axle modulators, can be actuated by a control unit (ECU), which electropneumatic valves then, in a manner dependent on a demanded vehicle target deceleration, pneumatically transmit a brake pressure to the brake cylinders of service brakes of the brake system.

In brake systems for a vehicle combination, the brake system has a trailer control unit, also referred to as Trailer Control Valve (TCV), which is provided for also providing a pneumatic output, correspondingly to the vehicle target decelerations predefined by the tractor vehicle, via ports, specifically a trailer brake pressure port and a trailer supply pressure port, which are also referred to as yellow and red coupling head. Via the trailer supply pressure port, the trailer vehicle is provided with a supply pressure from a reservoir, provided for that purpose, of the tractor vehicle, whereas the corresponding brake pressure is output via the trailer brake pressure port.

As a further component or module, brake systems of the above generic type have an immobilizing brake unit, in particular an electropneumatic handbrake (EPH) or a conventional purely pneumatic immobilizing brake unit. Such immobilizing brake units are commonly operated with so-called spring-type actuators, that is to say brake devices which brake one or more axles of the tractor vehicle owing to a spring force. In the aerated state, the brakes are released, and in the ventilated state, they are braked. In an unpressurized state, the corresponding vehicle is thus braked. For the activation of the immobilizing brake unit, in the case of an electropneumatic handbrake (EPH), an electrical handbrake switch is generally provided in the driver's cab of the tractor vehicle, for outputting a corresponding signal to an electronic control unit, which then switches one or more electropneumatic valves such that the spring-type actuators are either ventilated or aerated. In the case of conventional purely pneumatic immobilizing brake units, a valve is generally provided in the driver's cab, for outputting, in the event of corresponding switching, a control pressure in order to ventilate or aerate the spring-type actuators.

The immobilizing brake unit, that is to say the electropneumatic handbrake, is used for parking the vehicle combination, but also as an additional brake in particular situations. That is to say, aside from the normal service brakes, the spring-type actuators are at least partially ventilated in order to use these additionally or alternatively for braking purposes. Here, to pneumatically output a corresponding brake signal for the trailer vehicle also, use is generally made of a so-called inverse relay valve which outputs a rising pressure on the basis of a falling pressure in the spring-type actuators. Such inverse relay valves are of complex construction and have multiple control pistons which interact with one another by way of various control surfaces and various control chambers. Thus, for example during a purely auxiliary braking operation, braking is performed exclusively by spring-type actuators in the tractor vehicle and service brakes in the trailer vehicle. The service brakes in the tractor vehicle are not actuated during purely auxiliary braking operations. Alternatively, a redundancy mode may also be implemented, in which, for example in the event of a circuit failure at the rear axle, the spring-type actuators are used for assistance as an alternative to the service brakes. The front axle can continue to be braked by service brakes, and the trailer vehicle likewise by service brakes.

Furthermore, in brake systems of the type mentioned in the introduction, a distinction is made between so-called "European trailer control" and "Scandinavian trailer control". Whereas it is the case in "European trailer control" that, in the parked state of the vehicle combination, a positive brake pressure corresponding to the ventilated spring-type actuators is output at the trailer vehicle in order to additionally brake the latter via the trailer service brakes, the opposite is the case in "Scandinavian trailer control": in the parked state of the vehicle combination, the service brakes of the trailer vehicle should be released. This means that, in the case of "European trailer control", it is necessary in the parked state of the vehicle combination, that is to say in the electrically deenergized state, for a positive brake pressure to be permanently output by the trailer control unit (TCV) to the service brakes of the trailer vehicle.

Since it is thus the case in practice that the trailer control unit (TCV) and the immobilizing brake unit (EPH) interact, an integration of these two modules has proven to be desirable. A first approach for the integration is disclosed for example in DE 10 2016 003 034 A1. Whereas the immobilizing brake unit (EPH) has previously commonly been integrated into a compressed-air treatment unit, DE 10 2016 003 034 A1 discloses integrating the immobilizing brake unit (EPH) into the trailer control unit (TCV). This supposedly promotes a particularly simple integration of the electropneumatic components into the vehicle. A corresponding situation supposedly applies if the control device is at least partially integrated in a trailer device of this type.

Similarly, DE 10 2008 014 458 A1 from this applicant also proposes an electropneumatic device, in particular an air treatment device, an axle modulator, a trailer control valve, a control device of an electronic brake system or a vehicle dynamics control device, and/or an electropneumatic device of the vehicle, in particular an air treatment device or an air suspension device with an immobilizing brake function integrated therein.

A practical embodiment for "Scandinavian trailer control" is disclosed in DE 10 2015 112 490 A1. This document discloses an electropneumatic control unit according to the preamble of claim 1. The control unit has a common control unit (ECU) both for an immobilizing brake unit (EPH) and for a trailer control unit (TCV). Specifically, DE 10 2015 112 490 A1 has disclosed an electropneumatic control device of an electropneumatic brake system of a tractor vehicle-trailer combination at least for controlling the immobilizing brake of the tractor vehicle-trailer combination and the auxiliary braking of the tractor vehicle-trailer combination and the service braking at least of the trailer, having at least one housing, in or on which the following is arranged: a) a pneumatic control input port for a control line which leads to a pneumatic channel of a service brake actuating device of the tractor vehicle, b) a pneumatic supply port for a supply line which leads to at least one compressed-air reservoir of the tractor vehicle, c) a pneumatic control output port for a service line which leads to a "brake" coupling head of the tractor vehicle, d) a pneumatic supply output port for a supply line which leads to a "reservoir" coupling head of the tractor vehicle, e) an immobilizing brake output port for a brake line which leads to a spring-type brake cylinder of the tractor vehicle, f) an electric immobilizing brake control port for a control line which leads to an electric immobilizing brake actuating device, g) an electric service brake control port for a signal line which leads to an electrical channel of the service brake actuating device, h) a first relay valve having a control input, a first working output and a supply input, wherein the first working output is connected to the immobilizing brake output port and the supply input is connected to the supply input port, i) an electronic control unit, j) a first electromagnetic inlet/outlet valve combination which is controlled by the electronic control unit and which shuts off the control input of the first relay valve, connects this control input to a compressed-air sink or connects this control input to the pneumatic supply port, k) a second relay valve having a pneumatic supply input, which is connected to the supply input port, a pneumatic supply output, which is connected to the supply output port, a second working output, which is connected to the control output port and having a first pneumatic control input and a second pneumatic control input, l) an electromagnetic valve device which is controlled by the electronic control unit and which has a second electromagnetic inlet/outlet valve combination and an electromagnetic backup valve, wherein the backup valve, in the electrically deenergized state, connects the control input port to the first pneumatic control input of the second relay valve and, when electrically energized, shuts off this connection, and wherein the second electromagnetic inlet/outlet valve combination shuts off a second pneumatic control input of the second relay valve, connects this second pneumatic control input to a compressed-air sink or connects this second pneumatic control input to the pneumatic supply input port, wherein m) the second relay valve comprises two control pistons, a first control piston which delimits a first control chamber connected to the first pneumatic control input, and a second control piston which delimits a second control chamber connected to the second pneumatic control input, wherein the first control piston and the second control piston interact with a double-seat valve which has an inlet valve and an outlet valve for the aeration or ventilation of the second working output. By an electromagnetic valve device, the two control pistons of the second relay valve can be controlled such that via the first control piston, service braking of the trailer and auxiliary braking is performed, if the spring-type actuators of the tractor vehicle are used for braking. The second control piston is used for a redundancy situation, if the vehicle driver manually outputs a redundancy pressure via a brake pedal. "European trailer control" requiring that the trailer is braked by a brake pressure from the service brakes in the electrically deenergized state of the vehicle with ventilated spring-type actuators is not possible, and is also explicitly not provided for, in the configuration from DE 10 2015 112 490 A1. Furthermore, the construction of the relay valve with two control pistons in one relay valve is complex.

Furthermore, DE 10 2012 000 435 A1 discloses an immobilizing brake module for "European trailer control". The module disclosed in this document utilizes a relay valve and a first and a second bistable valve in order to be able to output the corresponding brake pressure for the service brakes of the trailer even in the electrically deenergized state with ventilated spring-type actuators.

Strictly modular approaches also exist, which make it possible for those modules which are required for the respective usage situation to be brought together. Such a system is known from DE 10 2004 051 309 B4. This document discloses an electropneumatic central unit of the utility vehicle constructed from modules with electrical and/or pneumatic components. The central unit may be assembled from individual modules in order to realize corresponding functionalities. The individual modules have electrical connections and pneumatic ports which correspond to one another.

A desirable aspect nowadays is also the retrofittability of individual modules and components or the exchange thereof. An integrated approach, as is pursued for example in DE 10 2015 112 490 A1 and also in DE 10 2016 003 034 A1, is therefore not always desirable. For example, an electropneumatic handbrake unit is already present in a vehicle and should not or cannot be exchanged.

SUMMARY

It is therefore an object of the present invention to specify an electropneumatic trailer control module in the case of which the abovementioned functionalities, in particular with regard to the "Scandinavian" and the "European trailer control", and also auxiliary braking of the trailer vehicle are possible. The trailer control module should take up a small installation space, be inexpensive, and exhibit low susceptibility to failure.

This object is achieved in the case of an electropneumatic trailer control module of the above type in that the electronic control unit has a parking brake signal input for receiving an electronic brake representation signal which represents the actuation of an immobilizing brake of the tractor vehicle, wherein the electronic control unit is configured to, on the basis of the brake representation signal, switch at least one valve of the one or more electropneumatic valves of the trailer control valve unit in order to output a brake pressure at the trailer brake pressure port. In this way, the electropneumatic trailer control module can be easily installed in an existing tractor vehicle of a vehicle combination. It is not necessary to exchange the existing electropneumatic handbrake or the conventional purely pneumatic immobilizing brake unit. It is merely necessary for communication to be established in a connection between another control unit, for example of the electropneumatic handbrake, a superordinate control unit, a central module or another peripheral device which is involved with the actuation of an immobilizing brake or which receives or transmits a corresponding signal, and the electropneumatic trailer control module of the present invention.

In the present case, a brake representation signal is understood to be a signal which represents an actual braking operation by the immobilizing brakes or parking brakes or a braking demand for the immobilizing brakes or parking brakes. Such a brake representation signal may be provided directly by a further control unit, for example a central module (for example via CAN bus), or a handbrake switch (for example via LIN bus). In one variant, it may also be an electronic signal of a pressure sensor which detects a brake pressure. The pressure sensor may be arranged internally, that is to say within the electropneumatic trailer control module, or externally with respect thereto.

The parking brake signal input is preferably formed on the electronic control unit (ECU).

Owing to the particular design of the electronic control unit with the parking brake signal input, the electropneumatic trailer control module of the present invention is capable of performing both auxiliary braking via the service brakes of the trailer vehicle in the event that the immobilizing brakes of the tractor vehicle are used as an auxiliary brake, and parking braking via the service brakes if European trailer control is implemented. The electropneumatic trailer control module of the present invention is thus capable of permitting easy retrofitting of these functionalities without excessively interfering with the existing tractor vehicle.

In a first preferred embodiment, the trailer control valve unit has at least one inlet valve with a first inlet valve port and with a second inlet valve port, wherein the first inlet valve port is connected to the reservoir input and the electronic control unit is configured to, on the basis of the brake representation signal, switch the inlet valve in order to output a brake pressure at the trailer brake pressure port. The inlet valve may be designed, for example, as a 2/2 directional valve with a first and a second switching state, wherein the inlet valve preferably remains in the first switching state when electrically deenergized. In one alternative, the inlet valve may also be designed as a 3/2 directional valve and thus at the same time impart a further functionality, such as ventilation, for example.

In a further preferred embodiment, the electronic control unit is configured to receive the brake representation signal from a further control unit. This further control unit is not the electronic control unit (ECU) of the electropneumatic trailer control module. In a first alternative, the further control unit is an electronic control unit of an immobilizing brake unit. In a second alternative, the further control unit is a central module.

The central module is that module which centrally controls the brake system and which typically provides a corresponding service brake signal to the one or more service brakes of the tractor vehicle. The central module also typically provides an auxiliary braking demand in the event that the immobilizing brakes are to be used for auxiliary braking. It is therefore a particularly simple solution if the electronic control unit is configured to receive the brake representation signal from the central module. It is preferable if, for this purpose, a service brake signal input and/or the parking brake signal input is connected to a corresponding output of the central module. The brake representation signal provided by the central module is in this case an electronic signal, and may be the same signal that, for auxiliary braking, is transmitted to the immobilizing brakes or to the electropneumatic immobilizing brake unit of the tractor vehicle, or a corresponding signal or a derived signal. Provision may also be made for the central module to transmit a separate brake signal provided specifically for the trailer vehicle, which then forms the brake representation signal in this case.

The immobilizing brake unit controls the immobilizing brakes, which in particular comprise spring-type actuators. In one alternative, the immobilizing brake unit provides the brake representation signal at the parking brake signal input of the electropneumatic trailer control module. This embodiment is preferred in particular if it is sought to realize a fallback level in the brake system for the event of failure of the central module. In this case, in this embodiment, it is possible to brake the trailer in a manner dependent on the immobilizing brakes.

In a further preferred embodiment, the parking brake signal input is designed to be connected to a pressure sensor, wherein the electronic control unit is configured to receive the electronic brake representation signal from this pressure sensor. In this case, the electronic pressure signal provided by the pressure sensor forms the brake representation signal. The pressure sensor is preferably configured to detect a brake pressure of at least one immobilizing brake, preferably a pressure in a cylinder of a spring-type actuator of the tractor vehicle. Alternatively, the pressure sensor is configured to detect a pressure of a pilot-control unit of an electropneumatic handbrake unit (EPH) or of a conventional purely pneumatic immobilizing brake unit of the tractor vehicle, in particular a control pressure which serves for the outputting of a brake pressure at the at least one immobilizing brake, in particular at the spring-type actuator. In the case of a conventional purely pneumatic immobilizing brake unit with European trailer control, a pneumatic trailer parking brake pressure can also be detected by the pressure sensor.

In a preferred variant, the electropneumatic trailer control module has a parking brake pressure input for receiving a pressure of a pneumatic immobilizing brake of the tractor vehicle. It is particularly preferable here for the electropneumatic trailer control module to comprise the pressure sensor, wherein the pressure sensor detects the pressure at the parking brake pressure input of the trailer control module and is connected to the parking brake signal input in order to provide an electronic pressure signal as a brake representation signal at the control unit. In this way, the electropneumatic trailer control module can be even more easily installed in a tractor vehicle. It is not necessary for the electropneumatic trailer control module to be connected via an electrical signal line to a superordinate unit, for example the central module, and for this superordinate control unit to be capable of providing an electronic brake representation signal. Rather, it is sufficient for a pneumatic line to lead from an immobilizing brake, or from a pilot-control unit connected upstream of the immobilizing brake, to the electropneumatic trailer control module such that the pressure at the parking brake pressure input can be detected by the internal pressure sensor of the trailer control module.

In a preferred embodiment, the trailer control module has a parking brake valve unit, having a pneumatically controlled switching valve which has a pneumatic control input for receiving a pneumatic control pressure, wherein, when the parking brake pressure input is ventilated, the pneumatically controlled switching valve is switched such that a brake pressure can be output at the trailer brake pressure port. The parking brake valve unit thus serves for outputting a corresponding brake pressure at the trailer brake pressure port, in order to apply braking at the service brakes of the trailer vehicle, when the spring-type actuators are ventilated, that is to say when the immobilizing brakes are engaged. This is advantageous in particular for so-called "European trailer control", in order, in a parked state of the tractor vehicle, to brake the trailer vehicle in an electrically deenergized state on the basis of a pneumatic control pressure alone.

Accordingly, the pneumatic control pressure is, in a first embodiment, the pressure at the spring-type actuator port.

Thus, for as long as the spring-type actuators are released and cylinders of the spring-type actuators are aerated, the pneumatically controlled switching valve is in the second switching position, and if the spring-type actuator port is connected to a pressure sink and the spring-type actuators are ventilated, the pneumatically controlled switching valve is moved into the second switching position owing to the spring loading.

Alternatively, in a further embodiment, it is possible for the pneumatic control pressure to be an immobilizing brake control pressure in an upstream pilot-control unit of the immobilizing brake unit. Use can thus likewise be made of a pressure corresponding or equivalent to the pressure at the spring-type actuator port, such as in particular a control pressure for the immobilizing brakes. For example, it is possible to use the control pressure at a relay valve of the immobilizing brake unit, both of an electropneumatic handbrake (EPH) and of a conventional purely pneumatic immobilizing brake unit. In the case of a conventional purely pneumatic immobilizing brake unit with European trailer control, this may also be a pneumatic trailer parking brake pressure. It is thus possible to use both the working pressure that actually prevails at at least one of the spring-type actuators as control pressure for the pneumatically controlled switching valve, and a control pressure that outputs the working pressure of the spring-type actuators.

In a further preferred embodiment, the electropneumatic control unit has a redundancy pressure port with a first redundancy pressure line for the connection of a brake transducer or of the brake or control pressure of one of the other vehicle axles, via which redundancy pressure port, for example by the actuation of a brake pedal, a pneumatic brake pressure can be output at the trailer brake pressure port. The brake transducer may be of purely pneumatic, electropneumatic or other form. The redundancy pressure port serves for receiving a vehicle target deceleration of a vehicle driver, who inputs this manually via the brake transducer. The vehicle driver can thus, in a fault situation, for example in the event of failure of the supply voltage, output a brake pressure purely pneumatically. Alternatively, a brake or control pressure of another vehicle axle, for example of the front axle, is output at the redundancy pressure port. In this way, it is then possible in the fault situation for the trailer vehicle to be braked correspondingly to the other axle.

In a preferred embodiment, provision is made for the pneumatically controlled switching valve to be connected via an outlet to a second redundancy pressure line, to which the first redundancy pressure line is also connectable, such that, when the pneumatically controlled switching valve is switched, a pressure can be output into the second redundancy pressure line. It is preferably consequently possible for a pneumatic brake pressure to be output to the trailer brake pressure port by switching the pneumatically controlled switching valve. In the redundancy pressure line, there is preferably arranged a redundancy valve, which may be formed for example as a 2/2 directional valve. The redundancy valve is used to lock out the redundancy pressure during normal driving operation. By virtue of the pneumatically controlled switching valve outputting the pressure into the second redundancy pressure line, the (downstream) redundancy valve can be used to lock out the pressure output by the pneumatically controlled switching valve. This makes it possible to implement a "trailer monitoring setting", as will be described in more detail further below. Furthermore, in this way, the design and the layout are further simplified, because only one line, specifically the second redundancy pressure line, is used to output both the redundancy pressure and the pressure from the pneumatically controlled switching valve (parking brake pressure). It has been found that this is possible because the redundancy pressure is output only when the vehicle combination is in operation, whereas the parking brake pressure is output only when the vehicle combination is parked. In this way, components are saved, and the construction can be made more compact.

It is furthermore preferable if the pneumatically controlled switching valve is formed as a 3/2 directional valve with a first, a second and a third port. The third port is preferably, as described above, connected to the second redundancy pressure line and formed as an outlet.

In a preferred variant, the first port of the 3/2 directional valve is connected to the redundancy pressure port, and the second port of the 3/2 directional valve is connected to the reservoir input. Thus, in this variant, the 3/2 directional valve switches back and forth between the redundancy pressure port and the reservoir input in a manner dependent on the pneumatic control pressure at the control input, and outputs this pressure into the second redundancy pressure line. The first port of the 3/2 directional valve is preferably connected via the first redundancy pressure line to the redundancy pressure port. Consequently, if the spring-type actuators are ventilated, the 3/2 directional valve switches, owing to the falling control pressure at the control input, to the first switching position, such that the reservoir input is connected to the second redundancy pressure line. In the case of the spring-type actuators being ventilated, the outputting of a manually input redundancy pressure is thus not possible; the redundancy pressure port is connected to the first port of the 3/2 directional valve, which is shut off in this switching state.

In a second variant, the first port of the pneumatically controlled 3/2 directional valve is connected to a pressure sink. In this variant, the 3/2 directional valve switches back and forth between the reservoir input and the pressure sink, such that the second redundancy pressure line, which is connected to the third port of the pneumatically controlled 3/2 directional valve, can be ventilated when the 3/2 directional valve is in a corresponding switching position. In this variant, the redundancy pressure port can be connected via a second valve, for example a 2/2 directional valve, to the second redundancy pressure line.

It is particularly preferable if the third port of the pneumatically controlled 3/2 directional valve is connected to a first shuttle valve input of a shuttle valve, a second shuttle valve input of the shuttle valve is connected to the redundancy pressure port, and a shuttle valve output of the shuttle valve is connected to the second redundancy pressure line. The shuttle valve is preferably formed as a so-called select-high valve with a double-acting check valve. This means that always the higher pressure prevailing at the first and second shuttle valve inputs is output at the shuttle valve outlet. In this variant, it is possible, despite an engaged or partially engaged parking brake, if this is used for example as an auxiliary brake, to manually output a redundancy pressure and, via the shuttle valve, to override the pressure that is output by the pneumatically controlled 3/2 directional valve. In this way, it is possible to dispense with a further 2/2 directional valve or another layout. A shuttle valve is a relatively small component, which is preferably integrated with the pneumatically controlled 3/2 directional valve.

In a preferred refinement, provision is made for an electronic switching valve to be arranged between an outlet of the pneumatically controlled switching valve and the trailer brake pressure port, such that, when the spring-type actuator port is connected to the pressure sink, an outputting of a brake pressure at the trailer brake pressure port can be prevented. The electronic switching valve is preferably formed as a 3/2 directional valve or 2/2 directional valve. It is preferably open in an electrically deenergized position. Via the electronic switching valve, the outlet of the pneumatically controlled switching valve can be shut off. If the outlet is shut off, no brake pressure is output at the trailer brake pressure port. The outlet of the pneumatically controlled switching valve is preferably the third port of the pneumatically controlled 3/2 directional valve, if the pneumatically controlled switching valve is formed as a 3/2 directional valve.

The above variant is particularly preferable if the implementation of a so-called "trailer monitoring setting" is desired. A trailer monitoring setting serves for checking whether the vehicle combination is held stationary by the spring-type actuators in the tractor vehicle alone even without engaged service brakes in the trailer vehicle. For example, if the vehicle combination is parked at a location with a slight gradient, the driver should be able to engage a trailer monitoring setting in order to check this. This serves for safety if, owing to a leak, the brake force of the service brakes decreases over time if the vehicle combination is parked for a relatively long period of time. For the engagement of the "trailer monitoring setting", the driver preferably actuates, in the case of an electropneumatic handbrake (EPH), a corresponding switch which, via the control unit (ECU), causes the electronic switching valve to switch and shut off the outlet of the pneumatically controlled switching valve. After a predetermined time, the electronic switching valve is enabled again and switched into the open position, preferably without electrical energization, such that, then, a brake pressure is output at the trailer brake pressure port, which brake pressure can be used for engaging the service brakes of the trailer. This can be achieved similarly in the case of a conventional purely pneumatic immobilizing brake unit. Here, on the one hand, an electrical switch may be provided for the trailer monitoring setting, or the parking brake valve for actuating the immobilizing brake in the driver's cab has a third switching position for the trailer monitoring setting. The parking brake valve is designed to output two different control pressures: 1.) the control pressure for the spring-type actuators and 2.) the control pressure for the trailer or the trailer control unit (TCV). In the third switching position of the parking brake valve for the trailer monitoring setting, ambient pressure is output as control pressure for the spring-type actuators, and reservoir pressure is output as control pressure for the trailer or the trailer control unit (TCV). In this way, the spring-type actuators are applied, whilst the trailer remains unbraked (the control pressure for the trailer is inverted in the trailer control unit). If the parking brake valve is now moved into the parking position, the same control pressure that is also output for the spring-type actuators, that is to say in this case ambient pressure, is output for the trailer control unit.

One preferred embodiment provides for the trailer control unit to have a relay valve, which has a relay valve working input connected to the reservoir input, a relay valve output connected to the trailer brake pressure port, a relay valve ventilation output, via which the relay valve output is connectable to a pressure sink, and a relay valve control input, which opens into a common inner control chamber, wherein the relay valve control input is connectable via the trailer control valve unit to the reservoir input and/or to a pressure sink in order to output a brake pressure at the trailer brake pressure port, wherein both a service brake control pressure and a redundancy pressure can be output into the common control chamber. The relay valve preferably has a single control chamber. For this purpose, the trailer control valve unit preferably has an input valve and an outlet valve, wherein the relay valve control input is connectable via the inlet valve to the reservoir input and is connectable via the outlet valve to the pressure sink. The inlet and outlet valves may each be formed as a 2/2 directional valve, or they are jointly integrated as a 3/2 directional valve. By this construction, a particularly simple relay valve is used, which has only a single control chamber. Provision may be made for multiple inputs to open into this control chamber. It is however preferable for only a single relay valve control input to be provided.

The common control chamber of the relay valve is preferably delimited by a single control piston. The relay valve preferably also has only a single control piston. In this way, the construction is further simplified, and costs are reduced.

In a preferred refinement, the control chamber is connectable by an electronically switchable inlet valve to the reservoir input. The control chamber is preferably connectable to the second redundancy pressure line. For this purpose, it is possible for a further valve, for example an electronically switchable 2/2 directional valve, to be provided. Variants however also comprise a simple T-piece, a second relay valve control input which opens into the same control chamber, a 3/2 directional valve, or a select-high valve.

In one variant, the control chamber is connected to the first redundancy pressure line. The relay valve control input is preferably connected to the first redundancy pressure line. Provision may be made for a 2/2 directional valve to be provided between the first redundancy pressure line and the relay valve control input in order to be able to lock out the redundancy pressure in normal driving operation.

In a further preferred embodiment, the electropneumatic trailer control module has an input on the electronic control unit for a trailer control setting signal. As already described further above, in the case of "European trailer control", it is preferable for the trailer control module to be capable of implementing a trailer monitoring setting. In this trailer monitoring setting, in the case of "European trailer control", the immobilizing brakes of the tractor vehicle are engaged, but at the same time the outputting of a brake pressure for the service brakes of the trailer vehicle is blocked. In this way, it is sought to check whether the vehicle combination is reliably held stationary even by the immobilizing brakes of the tractor vehicle alone. To perform such a function, in the case of an electropneumatic handbrake, a switch is preferably provided in the driver's cab of the tractor vehicle, in particular an electrical switch which is actuated by the vehicle driver. This switch may be integrated into the handbrake switch. In this embodiment, the electropneumatic trailer control module therefore preferably has an input for a trailer monitoring setting signal which is provided by the trailer monitoring setting switch or by a further unit. The control unit is configured to, on the basis of the trailer monitoring setting signal, switch at least one valve such that the outputting of a brake pressure at the trailer brake pressure port is blocked. This embodiment of the invention is suitable in particular if the tractor vehicle has an electropneumatic handbrake (EPH), since in this case the signal for the trailer monitoring setting can be transmitted electronically. In the case of a conventional purely pneumatic immobilizing brake unit, it is generally the case that no electronic signal is transmitted for the trailer monitoring setting, but rather exclusively a pneumatic control pressure is transmitted, which is likewise fed to the electropneumatic trailer control module.

In systems with electropneumatic handbrake, the electronic control unit of the trailer control module is preferably configured to receive the trailer monitoring setting signal in digital or analog form and/or via a CAN bus. That is to say, it is firstly conceivable for the input for the trailer monitoring setting signal to be connected directly to a corresponding switch, or the input is connected via a CAN bus line to a control unit, in particular to the control unit of the electropneumatic handbrake or, in variants, also to the central module, and receives the trailer monitoring setting signal therefrom. Normally, via a parking brake actuator, for example an electrical handbrake switch in the case of an electropneumatic handbrake, a mode is demanded by the driver in which the immobilizing brakes, in particular spring-type actuators, are or remain engaged, and the service brakes of the trailer vehicle are released ("trailer monitoring setting"). In conventional parking brake systems, this is realized pneumatically in the parking brake valve via the additional switching position. In electropneumatic parking brake systems, as are preferred in this embodiment, this mode ("trailer monitoring setting") is generally realized by an additional switching position of the parking brake actuator, in particular handbrake switch. The trailer monitoring setting signal may thus originate directly from the switch or else from a sensor that detects a parking brake pressure. Provision may likewise be made for a sensor to detect the control pressure of the parking brake valve in a conventional purely pneumatic immobilizing brake unit, and to thus provide an electronic trailer monitoring setting signal.

In a preferred refinement, the electronic control unit of the electropneumatic trailer control module is configured to lock out the brake pressure for the service brakes of the trailer vehicle after the immobilizing brakes have been actuated for a predetermined period of time. A trailer monitoring setting is thus "enforced". The engagement of the service brakes of the trailer vehicle takes place only after the predetermined period of time has expired. This period of time may for example be three minutes. After actuation of a handbrake switch by the driver, the immobilizing brakes are thus consequently firstly activated, in particular the spring-type actuators are ventilated, and after the predetermined period of time has expired, a parking brake pressure is additionally output at the trailer brake pressure port in order to apply braking at the service brakes of the trailer vehicle.

In a further preferred embodiment, the electropneumatic trailer control module has a connection for receiving a redundant electronic brake representation signal, wherein the trailer control module is designed to switch at least one valve of the trailer control valve unit in a manner dependent on the received redundant electronic brake representation signal such that a corresponding brake pressure is output at the trailer brake pressure port. The redundant electronic brake representation signal is provided for example by a manually actuated brake transducer. During normal operation, an electronic brake signal is provided by a further control unit, for example a central module. If this further control unit fails, the electropneumatic trailer control module according to this embodiment is configured to receive and use a redundant electronic brake representation signal. The redundant electronic brake representation signal is preferably provided by an electronic control unit of the immobilizing brake unit (EPH), which preferably controls the activation of at least one of the immobilizing brakes for redundant braking of the tractor vehicle in the event of a fault. This makes it possible to brake the trailer in accordance with the braking caused by the immobilizing brake unit.

Here, provision is preferably made for the electropneumatic trailer control module to have a redundant pressure sensor which is arranged on the first and/or second redundancy pressure line and/or at the redundancy pressure port and which is designed to detect the pneumatic redundancy pressure at the redundancy pressure port or in the first redundancy pressure line and to provide a corresponding redundancy pressure signal as a redundant electronic brake representation signal to the control unit. The redundancy pressure signal provided by the redundant pressure sensor represents a driver demand, because the pressure sensor detects the redundancy pressure output manually via the brake transducer. The control unit is preferably designed to compare the brake representation signal, which this control unit receives from the pressure sensor as a redundancy pressure signal, with a service brake signal received from the central module or a further control unit (for example control unit for autonomous driving). If the brake representation signal represents a greater deceleration demand than the service brake signal received from a further control unit, the control unit triggers the switching of at least one valve of the trailer control valve unit in order to permit the outputting of a brake pressure at the trailer brake pressure port on the basis of the redundancy pressure. In other words, if the driver demands a more intense deceleration than the further control unit, the further control unit is locked out, and the driver takes over manually. In this case, too, the activation of the electropneumatic trailer control module via the immobilizing brake unit can be realized by the redundant electronic brake representation signal.

According to a second aspect of the invention, the object mentioned in the introduction is achieved by a tractor vehicle which has an electropneumatic trailer control module according to one of the above-described preferred embodiments of an electropneumatic trailer control module according to the first aspect of the invention. With regard to the refinements of the exemplary embodiments and the advantages thereof, reference is made to the above description in its entirety.

Embodiments of the invention will now be described below on the basis of the drawing. The drawing is not necessarily intended to illustrate the embodiments to scale; rather, the drawing is of schematic and/or slightly distorted form where expedient for explanatory purposes. With regard to additions to the teaching that emerges directly from the drawing, reference is made to the relevant prior art. Note here that numerous modifications and changes regarding the form and the detail of an embodiment may be made without departing from the general concept of the invention. The features of the invention disclosed in the description, in the drawing and in the claims may be essential to the refinement of the invention both individually and in any desired combination. Furthermore, the scope of the invention encompasses all combinations of at least two of the features disclosed in the description, in the drawing and/or in the claims. The general concept of the invention is not restricted to the exact form or the detail of the preferred embodiments shown and described below, or restricted to a subject matter which would be restricted in relation to the subject matter claimed in the claims. Where dimensional ranges are stated, it is also the intention that values lying within the stated limits are disclosed, and can be used and claimed as desired, as limit values. For the sake of simplicity, the same reference designations are used below for identical or similar parts or parts with identical or similar function.

Further advantages, features and details of the invention will emerge from the following description of the preferred embodiments and on the basis of the drawings. The drawings are provided herewith for purely illustrative purposes and are not intended to limit the scope of the present invention.

DETAILED DESCRIPTION

Figure 1:
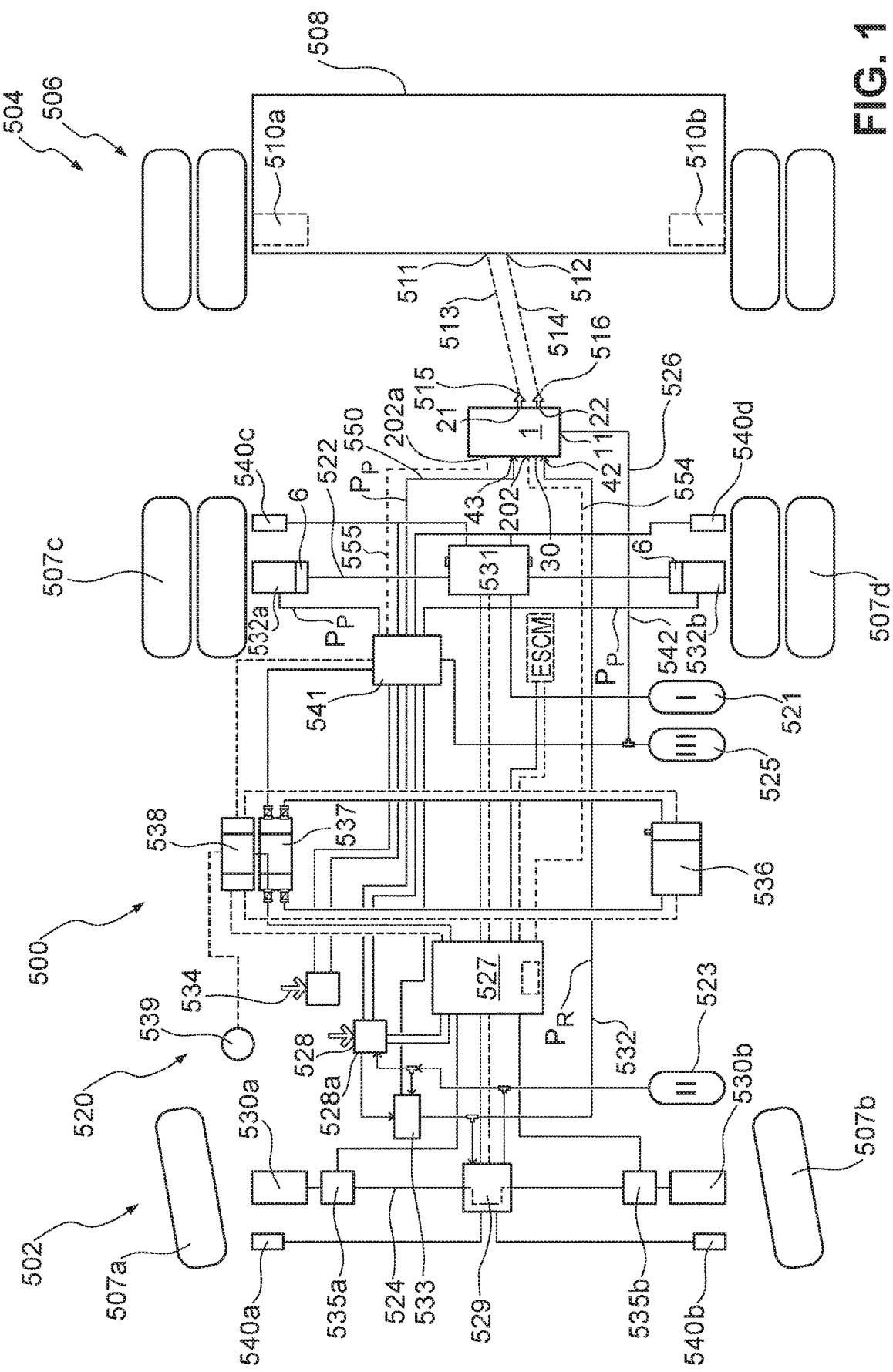
FIG. 1 shows a schematic overall layout of a brake system for a vehicle combination with an electropneumatic trailer control module according to the invention.

FIG. 1 firstly illustrates the overall construction on the basis of a vehicle combination 500, which comprises a tractor vehicle 502 and a trailer vehicle 504. The trailer vehicle 504 is shown here only schematically, specifically only one axle 506 of the trailer vehicle 504. The trailer vehicle 504 has a trailer service brake system 508 (illustrated only schematically) which is connectable via corresponding ports 511, 512 and pneumatic lines 513, 514 to corresponding ports 515, 516 on the tractor vehicle 502. Via the port 515, the trailer vehicle 504 is connectable to a reservoir 525, and a brake pressure is transmitted via the port 516. The trailer service brake system 508 has schematically illustrated service brakes 510a, 510b.

The tractor vehicle 502 has a brake system 520, which comprises a first compressed-air reservoir 521 for a rear-axle brake circuit 522, a second compressed-air reservoir 523 for a front-axle brake circuit 524, and a third compressed-air reservoir 525 for a trailer brake circuit 542.

As a central and superordinate control unit, a central module 527 is provided, which operates purely electrically. This central module is connected to an electropneumatic brake transducer (BST) 528, and controls the service braking during travel. For this purpose, the central module 527 is connected to a front-axle modulator 529, which controls the brake force in two front service brakes 530a, 530b, and a rear-axle modulator 531, which controls the brake force in two service brakes 532a, 532b of the rear axle. Here, the service brakes 532a, 532b are formed as so-called Tristop brakes, and comprise both conventional hydraulic brake cylinders as service brakes and integrated spring-type immobilizing brakes, as will be described in more detail further below.

For the activation of an immobilizing brake in the service brakes 532a, 532b, the brake system 520 furthermore has an electrical handbrake switch (HCU) 534. The electrical handbrake switch is connected to an electropneumatic handbrake unit (EPH) or immobilizing brake unit 541. The immobilizing brake unit (EPH) 541 has a dedicated control unit (not shown separately) and outputs an immobilizing brake pressure PP at the Tristop brakes 532a, 532b in accordance with the demand of the electrical handbrake switch (HCU) 534.

In this exemplary embodiment, the brake system 520 also comprises an electropneumatic trailer control module 1 according to the invention. The electropneumatic trailer control module 1 has a reservoir input 11 via which it is connected, via a reservoir pressure feed line 562a,0 to the third compressed-air reservoir 525. In this exemplary embodiment, the electropneumatic trailer control module also has a redundancy pressure port 42 to which a redundancy pressure feed line 552 is connected, which leads to a bypass 533, which in turn is connected to a pneumatic control output 528a of the brake transducer 528.

Furthermore, the electropneumatic trailer control module 1 is connected to the handbrake unit (EPH) 541 via a pneumatic parking brake pressure line 550, via which the electropneumatic trailer control module 1 can receive the parking brake pressure output at the Tristop brakes 532a, 532b. Via a direct CAN bus 554, the electropneumatic trailer control module 1 is connected to the central module 527 via a CAN bus connection 202. The control unit of the immobilizing brake unit 541 is optionally connected via a CAN bus 555 to a CAN bus connection 202a of the electropneumatic trailer control module 1. Although a direct connection between the electropneumatic trailer control module 1 and the immobilizing brake unit 541 is shown here, it is likewise conceivable for these two components to be connected to one another via a vehicle bus 538.

The further elements shown in FIG. 1 are, in this exemplary embodiment, of a purely illustrative nature and include for example ABS modules 535a, 535b, a control unit 536 for autonomous driving, an energy source 537 for electrical energy, steering angle sensors 539, and sensors 540a, 540b, 540c, 540d for brake pad wear sensing.

For the control of the trailer vehicle 504, the electropneumatic trailer control module 1 is connected via a trailer supply pressure port 21 to the port 515, which is also referred to as "red coupling head", and via a trailer brake pressure port 22 to the port 516, which is also referred to as "yellow coupling head". The ports and the function thereof in relation to the electropneumatic trailer control module 1 will be discussed in more detail below.

Figure 2:
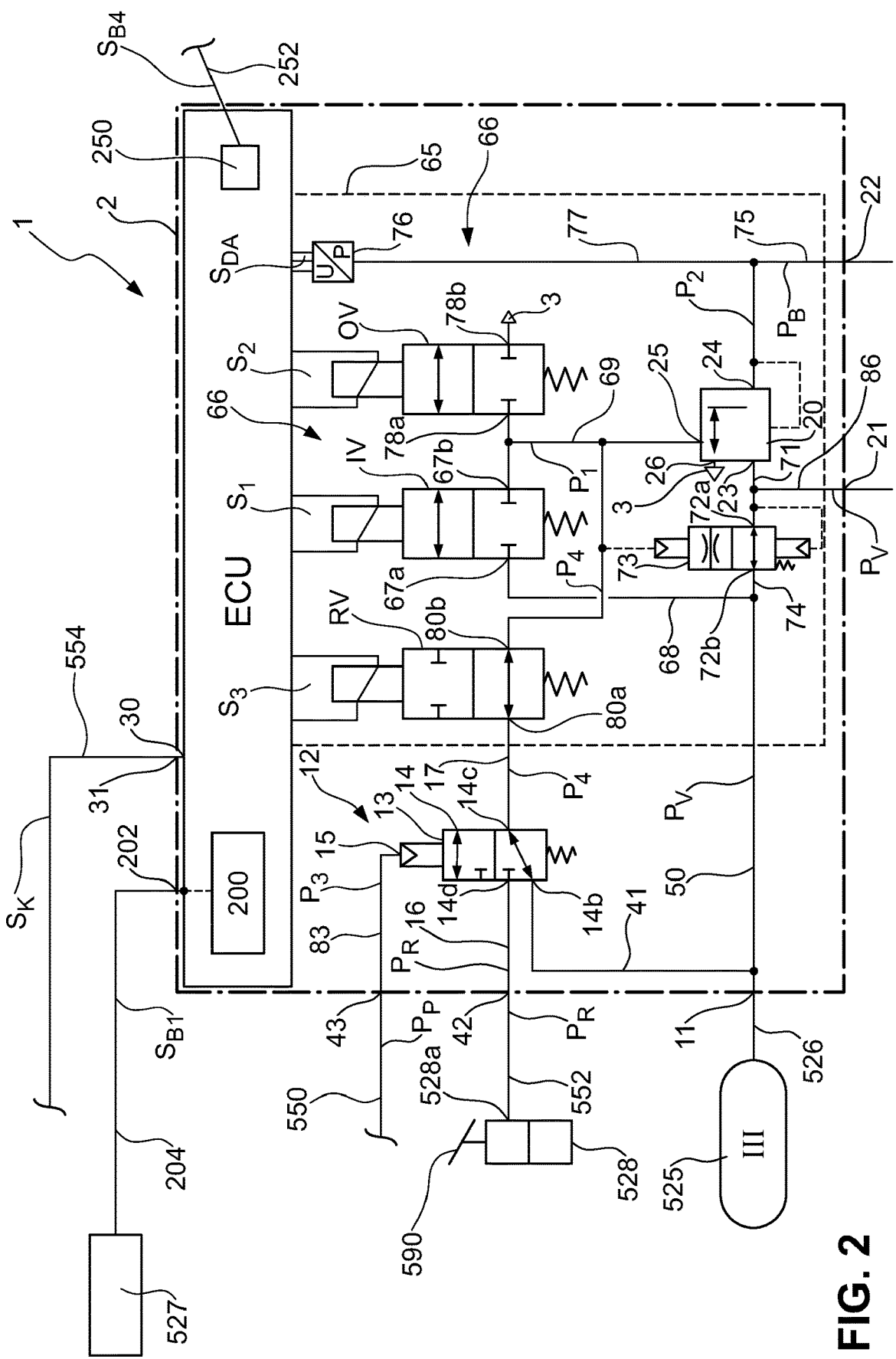
FIG. 2 shows a first example of an electropneumatic trailer control module according to the invention.

FIG. 2 illustrates the trailer control module 1 according to a first example in detail. The electropneumatic trailer control module 1 has a housing 2 in which an electronic control unit ECU and a trailer control valve unit 65 are arranged. The trailer control valve unit 65 has multiple valves, which will be described in detail below. A reservoir input 11 is formed on the housing 2, which reservoir input is connected via a reservoir pressure feed line 526 to the third compressed-air reservoir 525. Also formed on the housing 2 are a redundancy pressure port 42, to which a redundancy pressure feed line 552 is connected, and a parking brake pressure input 43, to which a parking brake pressure line 550 is connected, which, in this exemplary embodiment, is in turn connected to the electropneumatic handbrake unit (EPH) 541 (see FIG. 1). Furthermore, the trailer control module 1 has two pneumatic outputs, specifically firstly a trailer supply pressure port 21, at which the reservoir pressure PV prevails, and a trailer brake pressure port 22, at which a brake pressure PB can be output. A reservoir pressure distribution line 50 runs in the interior of the housing 2 from the reservoir input 11, via which reservoir pressure distribution line various components of the trailer control module 1 are supplied with reservoir pressure PV.

The trailer control valve unit 65 has an inlet-outlet valve unit 66, also referred to as pilot-control unit, which has an inlet valve IV, an outlet valve OV and a switching valve, formed here as a redundancy valve RV. Furthermore, the trailer control valve unit 65 has a first relay valve 20 which is formed not as an inverse relay valve but as a "normal relay valve". The inlet valve IV is formed as a 2/2 directional valve and has a first inlet valve port 67a and a second inlet valve port 67b. The first inlet valve port 67a is connected to a first reservoir pressure branch line 68 which branches off from the reservoir distribution line, and the second inlet valve port 67b is connected to a first control line 69. Whilst the reservoir pressure PV prevails in the first reservoir pressure branch line 68, a service brake control pressure (first control pressure) P1 can be output in the first control line 69 by electrical switching of the inlet valve IV on the basis of a signal S1 from the control unit ECU. The first control line 69 is connected to a relay valve control inlet 25 of the relay valve 20.

The relay valve 20 furthermore has a relay valve working input 23, a relay valve output 24 and a relay valve ventilation output 26. The relay valve ventilation output 26 is connected to a pressure sink 3. The relay valve working input 23 serves for receiving a reservoir pressure PV, and is initially connected to a second reservoir pressure branch line 71, which is connected to a first port 72a of a trailer breakaway valve 73. The trailer breakaway valve 73 is formed as a pneumatically switched 2/2 directional valve and is open when unpressurized, in the switching position shown in FIG. 2. With corresponding switching of the trailer breakaway valve 73, the first port 72a of the trailer breakaway valve 73 is connected via a throttle to the second port 72b of the trailer breakaway valve 73, which in turn is connected via a third reservoir pressure branch line 74 to the reservoir pressure distribution line 50. During normal operation, the trailer breakaway valve 73 is however in the position shown in FIG. 2, such that the reservoir pressure PV prevails at the relay valve working input 23. Furthermore, via the trailer breakaway valve 73, the trailer supply port 21 is supplied with reservoir pressure PV via a trailer supply line 86.

If the relay valve 20 now receives the service brake control pressure P1 at the relay valve control input 25, the relay valve 20 outputs a corresponding relay working pressure P2 at the relay valve output 24 and provides this as brake pressure PB at the trailer brake pressure port 22 via a trailer brake pressure line 75. For corresponding closed-loop pressure control, a brake pressure sensor 76 for the trailer control module 1 is provided, which brake pressure sensor is connected via a brake pressure measurement line 77 to the trailer brake pressure line 75 and provides a corresponding pressure signal SDA at the control unit ECU.

The outlet valve OV is electropneumatically switched and, upon receipt of a signal S2 from the control unit ECU, can be moved from the first, electrically deenergized switching state shown in FIG. 2, in which this outlet valve is closed, into an open switching state, which is not shown in FIG. 2.

For the ventilation of the service brakes 510a, 510b of the trailer vehicle 504 and thus for the reduction of a brake pressure PB at the trailer brake pressure port 22, the outlet valve OV is provided. Like the inlet valve IV, the outlet valve OV is designed as a 2/2 directional valve and has a first outlet valve port 78a and a second outlet valve port 78b. The first outlet valve port 78a is connected to the first control line 69, and the second outlet valve port 78b is connected to a pressure sink 3.

In one variant, the inlet and outlet valves IV/OV are integrated and formed as a 3/2 directional valve, wherein a first port is connected to the first reservoir pressure branch line 68, a second port is connected to the first control line 69, and a third port is connected to the pressure sink 3.

In order, in a fault situation in which for example no signals S1, S2 are provided by the control unit ECU and the inlet and outlet valves IV, OV are electrically deenergized, to be able to manually replace the brake pressure PB that is output by the control unit ECU in the normal situation, the trailer control module 1 according to the invention has the redundancy pressure port 42. A brake transducer 528 is connected to the redundancy pressure port 42 via a redundancy pressure feed line 552 (see FIG. 1). In the interior of the housing 2, a first redundancy pressure line 16 is connected to the redundancy pressure port 42. In this first exemplary embodiment, the redundancy pressure line 16 extends to a pneumatic switching valve 13, and more specifically is connected to a first port 14a of the switching valve 13 (which will be described in more detail further below). During normal driving operation, the switching valve 13 is in the second switching position (not shown), and the first port 14a is connected to the third port 14c. To a third port 14c of the switching valve 13 there is then connected a second redundancy pressure line 17, which in turn is connected to a first redundancy valve port 80a of a redundancy valve RV. The second redundancy valve port 80b is connected to a redundancy pressure control line 81, which opens into the first control line 69 and thus into the relay valve control input 25 of the relay valve 20.

The redundancy valve RV is formed as a 2/2 directional valve and has a first and a second switching position, wherein this redundancy valve is shown in the first, open switching position in FIG. 2. The redundancy valve RV is open when electrically deenergized and serves to be able to output a brake pressure PB even in the fault situation in which the inlet-outlet valve unit 66 is electrically deenergized. If, in the fault situation, a redundancy pressure PR is output in the redundancy pressure feed line 552 by actuation of the pedal 590 of the brake transducer 528, this redundancy pressure PR is provided at the relay valve control input 25 of the relay valve 20 via the first redundancy pressure line 16, the switching valve 13, the second redundancy pressure line 17, the open redundancy valve RV and the redundancy pressure control line 81. The brake pressure PB is consequently output at the relay valve output 24 of the relay valve 20.

To link the trailer control module 1 to the handbrake unit (EPH) 541 in order, in accordance with "European trailer control", to use the service brakes 510a, 510b of the trailer vehicle 504 also as parking brakes and thus output a brake pressure PB at the trailer brake pressure port 22 in the parked state whilst the immobilizing brake (spring-type actuators) 6 of the Tristop brakes 532a, 532b are ventilated, a parking brake valve unit 12 is provided, with the pneumatically controlled switching valve 13 which is designed as a 3/2 directional valve 14 and which has a pneumatic control input 15 for receiving a pneumatic control pressure P3, wherein, when the parking brake pressure input 43 is connected to the pressure sink 3, that is to say when the immobilizing brake 6 is ventilated, the pneumatically controlled switching valve 13 is switched such that a brake pressure PB can be output at the trailer brake pressure port 22. This is realized in that, in the unpressurized switching position of the switching valve 13, the third port 14c is connected to the second port 14b, to which second port a fourth reservoir pressure branch line 41 is connected, which in turn branches off from the reservoir pressure distribution line 50, and at which second port the reservoir pressure PV thus prevails.

The particular advantage here lies in the fact that there is no need to use an inverse relay piston, but the pneumatically controlled switching valve 13 is rather switched on the basis of the control pressure P3, which is in particular independent of a flowing current. The immobilizing brake pressure PP at the parking brake pressure input 43 is preferably used as control pressure P3. In the specific embodiment illustrated in FIG. 2, this is achieved by a pneumatic control line 83, which connects the parking brake pressure input 43 to the control input 15 of the pneumatically controlled switching valve 13. That is to say, in this embodiment with electropneumatic handbrake, the pressure of the spring-type actuators 6 prevails at the control input 15 of the pneumatically controlled switching valve 13.

By contrast, in the case of a brake system with a conventional pneumatic immobilizing brake, the control pressure of the trailer port of the parking brake valve in the driver's cab is preferably connected to the parking brake pressure input 43. Via this, it is then the case that the reservoir pressure is output in the first switching position (driving position), the ambient pressure is output in the second switching position (parking position), and the reservoir pressure is output in the third switching position (trailer monitoring setting). Thus, in the third switching position of the parking brake valve, the pneumatically controlled switching valve 13 in the second switching position (not shown), and the outputting of the brake pressure PB at the trailer brake pressure port 22 is prevented in this switching position.

During normal driving operation, the spring-type actuators 6 are aerated, and the pneumatically controlled 3/2 directional valve 14 is thus in the second switching position (not shown), and the redundancy pressure PR (if provided) is output at the third port 14c.

If the spring-type actuator 6 is now ventilated, be it owing to a parking position being assumed or owing to auxiliary braking by the spring-type actuators 6, the immobilizing brake pressure PP falls and, consequently, the control pressure P3 also decreases, and the pneumatically controlled 3/2 directional valve 14 switches into the first switching position shown in FIG. 2. Consequently, a corresponding control pressure P4 is now output at the third port 14c, which pressure corresponds to the reservoir pressure PV.

In one variant, the redundancy valve RV is already switched into an electrically deenergized state, and thus opened, in this state, and the fourth control pressure P4 consequently prevails at the relay valve control input 25 of the relay valve 20. In this way, a corresponding brake pressure PB is output at the trailer brake pressure port 22.

However, in a preferred variant, at the commencement of parking or stepped engagement of the immobilizing brake, the redundancy valve RV is initially electrically energized with the signal S3 and closed; the control pressure P4 output by the switching valve 13 is initially locked out. The engagement of the service brakes 510a, 510b of the trailer vehicle 504 is realized upon the commencement of parking by the inlet-outlet valve unit 66, which is correspondingly switched by the control unit ECU. That is to say, if for example the handbrake switch 534 is actuated, the redundancy valve RV initially remains closed. The control unit ECU however switches the inlet valve IV such that the service brake control pressure P1 prevails at the relay valve control input 25 and a corresponding brake pressure PB is output at the trailer brake pressure port 22, whilst the spring-type actuators 6 are ventilated, and impart their brake force, in a gradual manner. As soon as the spring-type actuators 6 have been ventilated to a certain degree, or have been completely ventilated, all of the valves RV, IV, OV of the inlet-outlet valve unit 66 are switched into an electrically deenergized state; the inlet valve IV closes, whilst the redundancy valve RV is opened. The fourth control pressure P4 now prevails at the relay valve control input 25 via the switching valve 13 and the redundancy valve RV, and the brake pressure PB is output; the service brakes 510a, 510b of the trailer vehicle 504 remain engaged.

The trailer control module 1 further has a first CAN bus connection 30 to which the first CAN bus line 554 is connected. This first CAN bus connection 30 is designed as an input 31 for a trailer monitoring setting signal SK. Since, in this example (FIGS. 1 and 2), an electropneumatic handbrake (EPH) is provided, the trailer monitoring setting signal SK is transmitted electronically. In the case of "European trailer control", for which the trailer control module 1 according to the first example (FIG. 2) is provided, it is necessary that the vehicle driver can engage a trailer monitoring setting. With the trailer monitoring setting, it is checked whether the vehicle combination 500 is reliably held at a standstill owing to the immobilizing brakes 6, 532a, 532b of the tractor vehicle 502 alone. It is therefore necessary that, in the trailer monitoring setting, the service brakes 510a, 510b of the trailer vehicle 504 are not engaged. Since, in this example (FIG. 2), the parking brake valve unit 12 "automatically" outputs brake pressure PB at the trailer brake pressure port 22 as soon as the spring-type actuators 6 are ventilated and the switching valve 13 switches into the first switching position shown in FIG. 2, in this example a mechanism is provided which prevents the outputting of the brake pressure PB in this case. For this purpose, a trailer monitoring setting signal SK is provided at the input 31 by the electric handbrake switch 534 or the central module 527 or another control unit. The control unit ECU is configured to process the trailer monitoring setting signal SK and to transmit a corresponding switching signal S3 to the redundancy valve RV, such that the redundancy valve RV switches to the second switching position (not shown in FIG. 2), such that the control pressure P4 is locked out. Additionally, the outlet valve OV must be briefly opened to ventilate any pressure that is presently locked in. In this case, there is then no service brake control pressure P1 prevailing at the relay valve control input 25, and no brake pressure PB is output at the trailer brake pressure port 22.

If the electropneumatic trailer control module 1 according to this invention is to be used with a conventional purely pneumatic immobilizing brake module, the parking brake valve (not shown) of the driver's cab, via which the vehicle driver demands the parking position and also the trailer monitoring setting, is preferably connected to the parking brake pressure input 43. If the vehicle driver selects the trailer monitoring setting via the parking brake valve, a control pressure is output at the parking brake pressure input 43, such that the switching valve 13 remains in the second switching position (not shown in FIG. 2) and, correspondingly, no control pressure P4 is output. It is consequently also the case that no parking brake pressure PB is output at the trailer brake pressure port 22. The position of the trailer can thus be monitored.

According to the invention, in this example (FIG. 2), the control unit ECU furthermore has a parking brake signal input 200 for receiving a first electronic brake representation signal SB1 which represents the actuation of an immobilizing brake 6, 532a, 532b of the tractor vehicle 502. In this example (FIG. 2), the parking brake signal input 200 is connected to a second CAN bus connection 202, to which a second CAN bus line 204 is connected, which in turn is connected to the central module 527. The first brake representation signal SB1 is in this case an electronic signal provided by the central module 527. The first brake representation signal SB1 represents braking by the immobilizing brakes 6, 532a, 532b and, in a simple embodiment, may be the signal that the central module 527 transmits to the handbrake unit 541. In one variant, the first brake representation signal SB1 is a signal derived therefrom or an independent signal provided by the central module 527.

The control unit ECU is configured to, on the basis of the received first brake representation signal SB1, switch at least one valve, preferably the inlet valve IV, via a signal S1 such that a brake pressure PB is output at the trailer brake pressure port 22. It is achieved in this way that the trailer vehicle 504 is braked in accordance with the tractor vehicle 502 when the immobilizing brakes 6, 532a, 532b of the tractor vehicle 502 are activated. In the specific example according to FIG. 2, when the inlet valve IV is switched, the first inlet valve port 67a is connected to the second inlet valve port 67b, such that the service brake control pressure P1 is output in the first control line 69, which service brake control pressure consequently prevails at the relay valve control input 25. The relay valve 20 thereupon outputs a relay working pressure P2 at the relay valve output 24, such that the brake pressure PB prevails at the trailer brake pressure port 22. Particularly simple integration of the trailer control module 1 into an existing tractor vehicle 502 can be achieved in this way. It is not necessary to provide an additional valve or the like in order to realize a connection between the electropneumatic handbrake unit (EPH) 541 and the trailer control module 1. Rather, it is sufficient to provide a corresponding second CAN bus line 204 from the central module 527 to the second CAN bus connection 202 such that the first brake representation signal SB1 can be provided at the parking brake signal input 200.

To implement a fallback level for the event that a fault occurs in the brake system, for example the central module 527 fails and is electrically deenergized, the electropneumatic trailer control module 1 according to this example (FIG. 2), more specifically the electronic control unit ECU, furthermore has a further connection 250 for receiving a redundant electronic brake representation signal SB4. Such a redundant electronic brake representation signal SB4 may for example be, in addition to the normally received deceleration demand signal for the service brakes 510a, 510b of the trailer vehicle 504, a redundant electronic signal output by a manual brake transducer 528. For example, the brake transducer 528 has a travel sensor, which converts an actuation of the pedal 590 into an electronic signal. For this purpose, the connection 250 is connected to a signal line 252. Optionally, the electropneumatic trailer control module 1 has a CAN bus connection 202a (see FIG. 1), to which a CAN bus 555 is connected, which leads to the immobilizing brake unit 541. Also via this CAN bus 555, the trailer control module 1 can receive the redundant electronic brake representation signal SB4 in the event of a fault.

Figure 10:
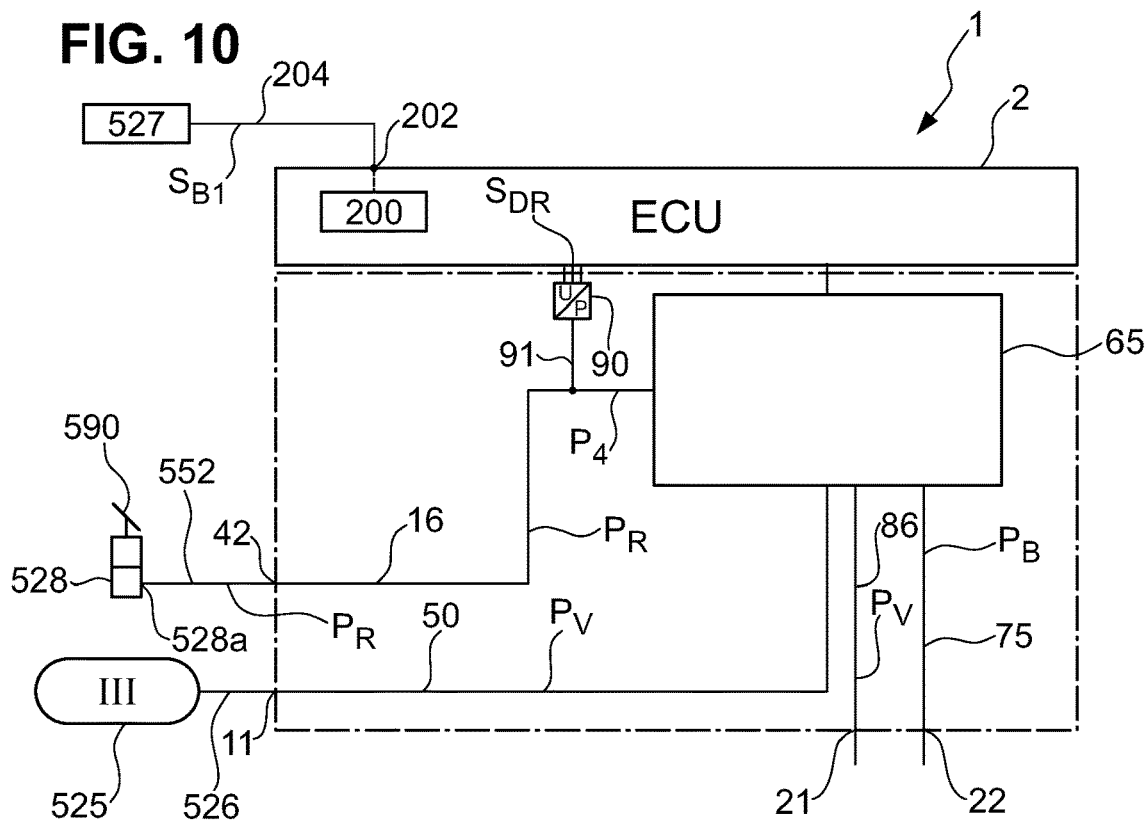
FIG. 10 shows a ninth example of the electropneumatic trailer control module.
Figure 11:
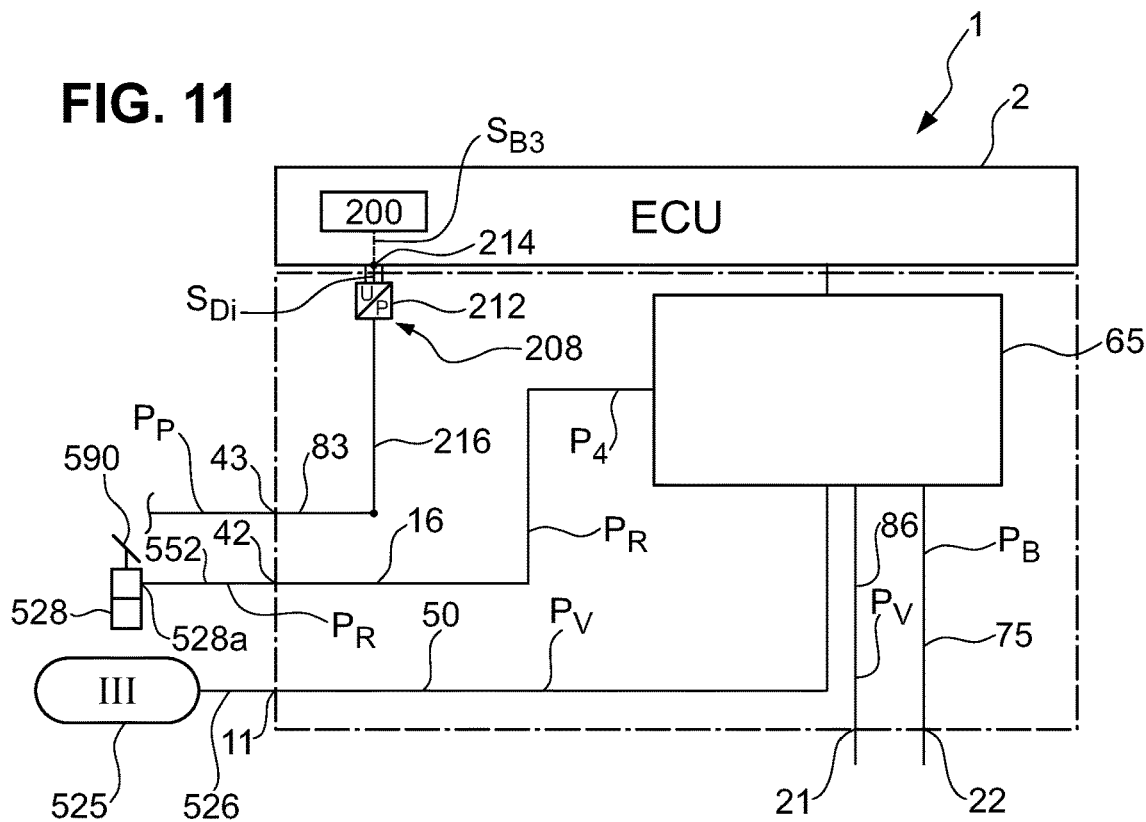
FIG. 11 shows a tenth example of the electropneumatic trailer control module.

Alternatively, the trailer control module 1 has an additional pressure sensor (not shown in FIG. 2, see FIGS. 7 and 10) that redundantly detects the redundancy pressure PR and provides a corresponding pressure signal SDR as the redundant brake representation signal SB4 at the port 250.

FIGS. 3 to 9 now show further exemplary embodiments of the electropneumatic trailer control module, wherein the trailer control valve unit 65 is illustrated in each case merely schematically as a "black box". The trailer control valve unit may be of the same design in the exemplary embodiments of FIGS. 3 to 9 as in the example of FIG. 2. The corresponding line connections will be designated below. Identical and similar elements are denoted by the same reference designations, such that reference is made to the above description in its entirety.

Figure 3:
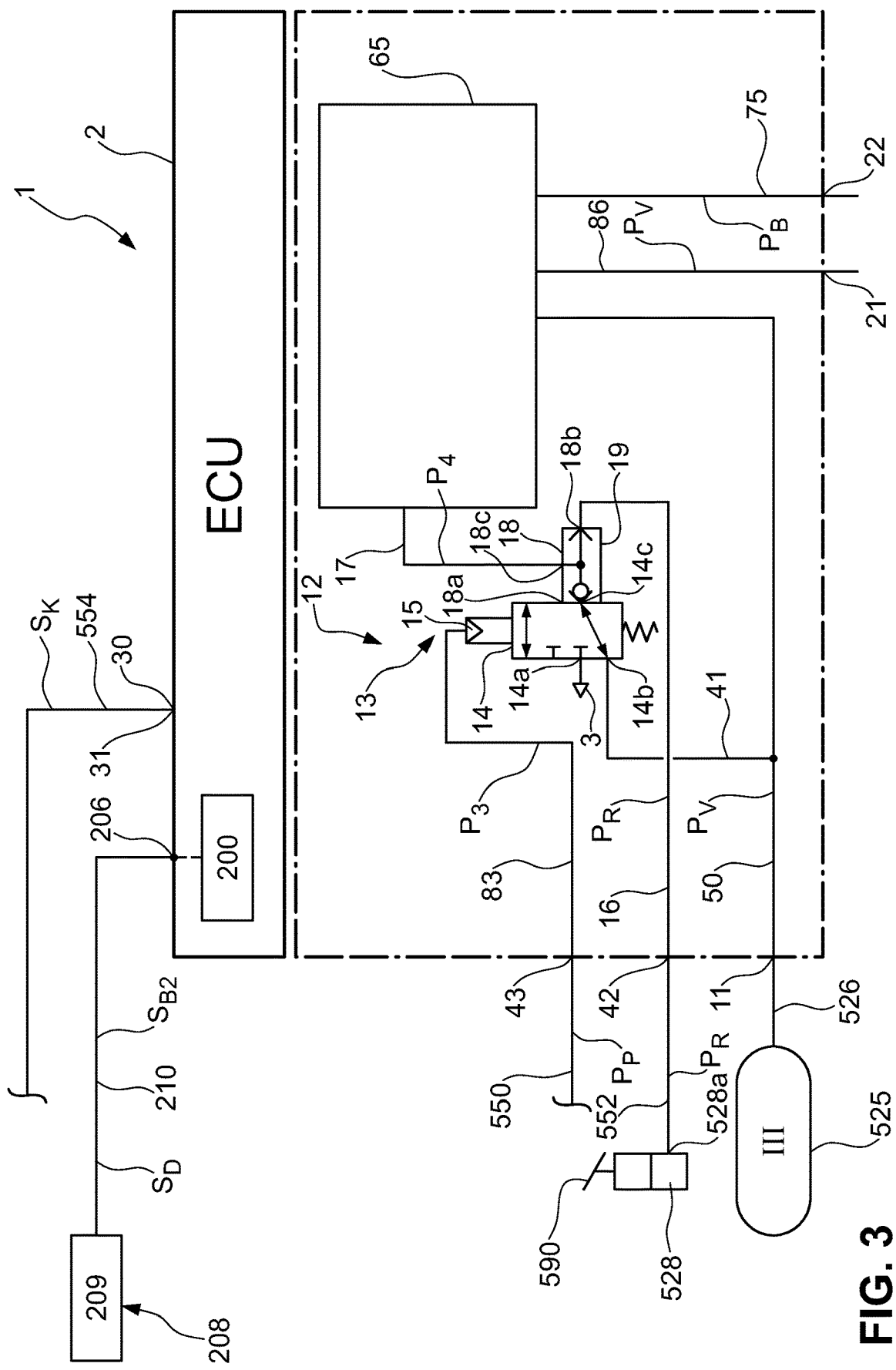
FIG. 3 shows a second example of the electropneumatic trailer control module.
Figure 4:
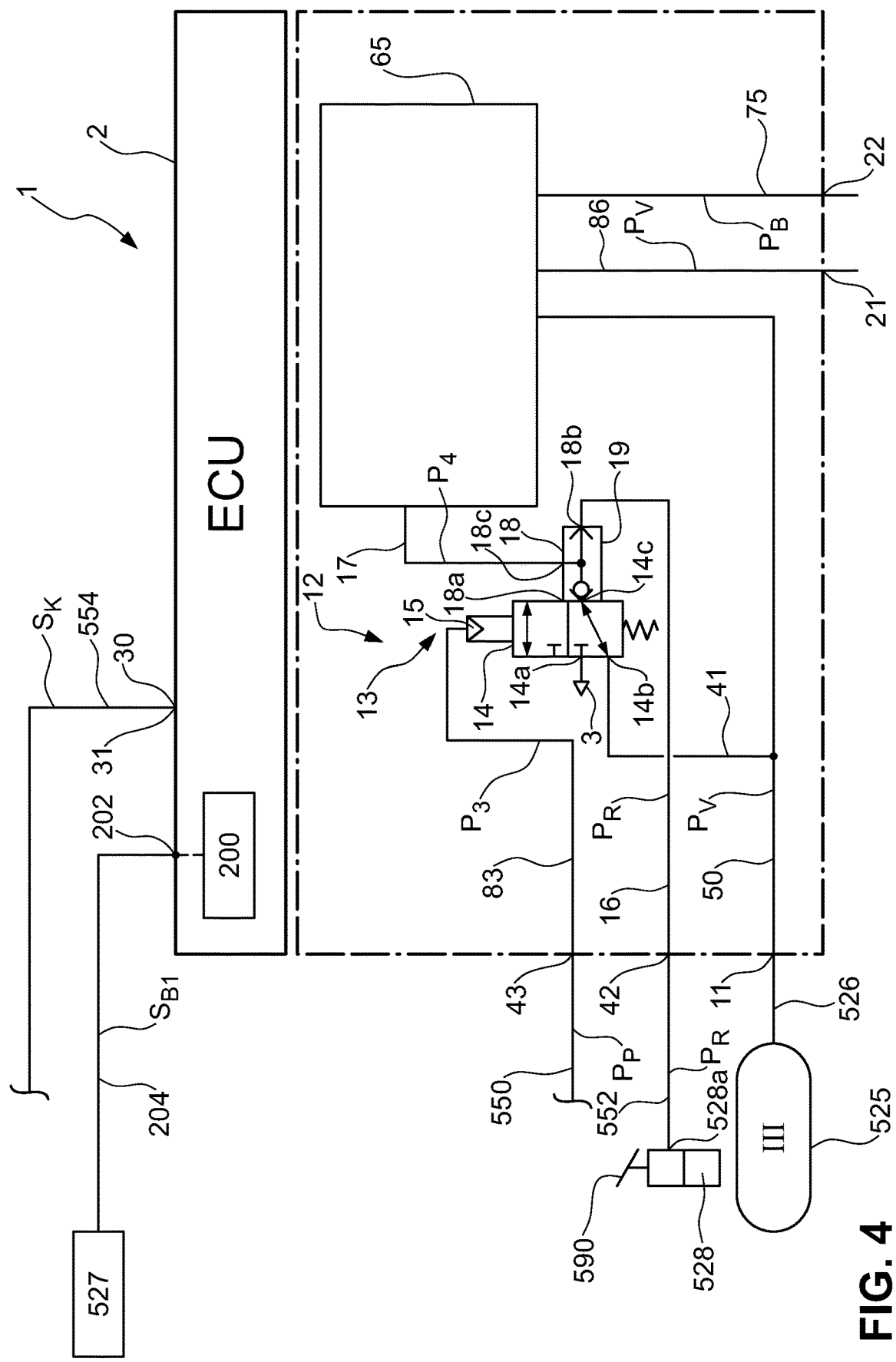
FIG. 4 shows a third example of the electropneumatic trailer control module.
Figure 5:
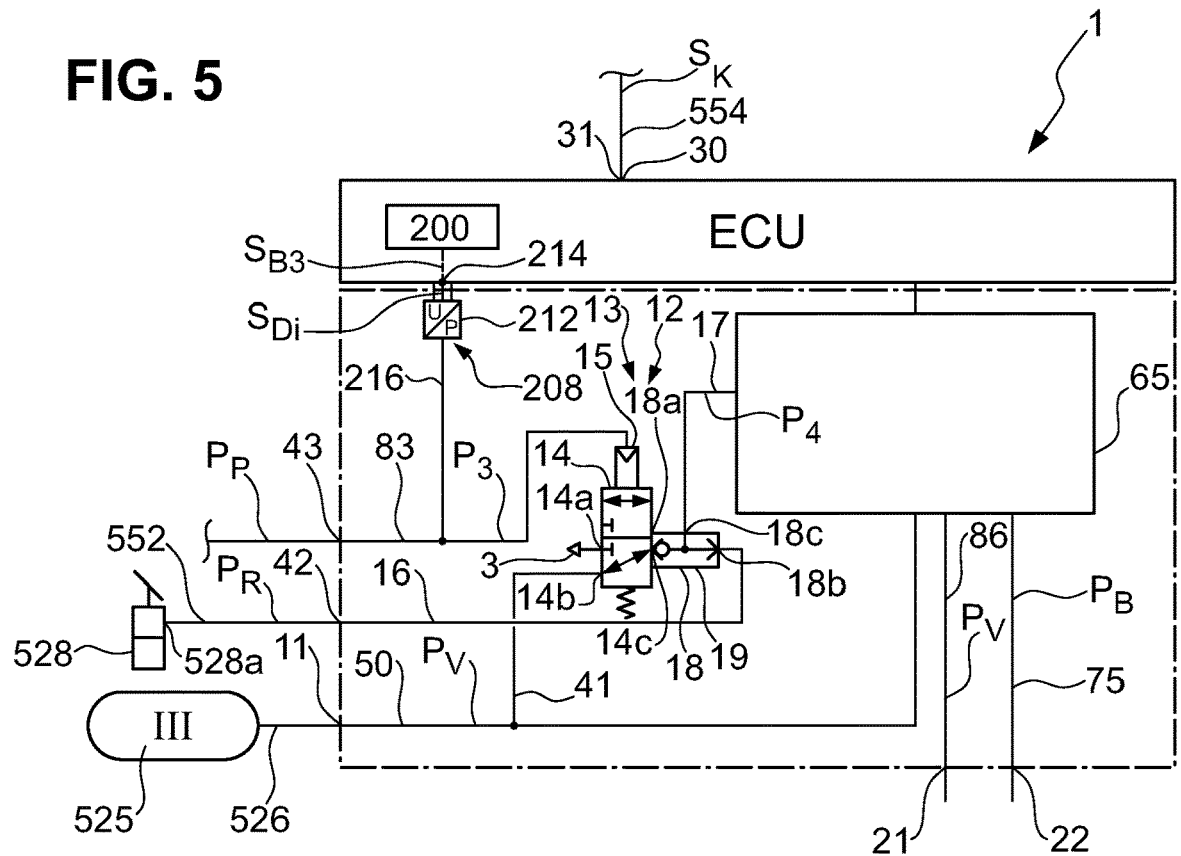
FIG. 5 shows a fourth example of the electropneumatic trailer control module.

A first difference in the example as per FIG. 3 in relation to the example as per FIG. 2 lies in the design of the pneumatically controlled switching valve 13. The third port 14c of the switching valve 13 is connected to a first shuttle valve input 18a of a shuttle valve 18. The shuttle valve 18 is preferably formed as a double-acting check valve 19, that is to say as a so-called select-high valve. The shuttle valve 18 has a second shuttle valve input 18b. The respectively higher pressure at the shuttle valve inputs 18a, 18b is output at the shuttle valve outlet 18c. In this example (FIG. 3), the first redundancy pressure line 16 is connected not directly to the first port 14a of the switching valve 13 but rather to the second shuttle valve input 18b. In the unpressurized switching position of the switching valve 13 shown in FIG. 3, the reservoir pressure PV thus prevails at the first shuttle valve input 18a, whilst the redundancy pressure PR prevails at the second shuttle valve input 18b. A control pressure P4 is output into the second redundancy pressure line 17, which is connected to the shuttle valve output 18c. The control pressure P4 is the respectively higher pressure of the reservoir pressure PV and the redundancy pressure PR. During normal driving operation, the immobilizing brakes of the tractor vehicle 502 are released, such that a control pressure P3 prevails at the control input 15 of the switching valve 13. The switching valve 13 is thus then in the second switching position (not shown in FIG. 3), in which the first port 14a is connected to the third port 14c. In this example (FIG. 3), the first port 14a is connected to a pressure sink 3. That is to say, during normal driving operation, ambient pressure P0 prevails at the port 14c, such that, via the shuttle valve 18, only the redundancy pressure PR can be output into the second redundancy pressure line 17 as control pressure P4. If the immobilizing brakes of the tractor vehicle are now engaged, that is to say the spring-type actuators 6 are ventilated, the switching valve 13 switches into the position shown in FIG. 3. A control pressure P4 is consequently output in the second redundancy pressure line 17, which control pressure leads to a brake pressure PB being output at the trailer brake pressure port 22. Braking is applied at the service brakes of the trailer vehicle 504.

A further difference in the second example (FIG. 3) is that the parking brake signal input 200 is designed to be connected to a pressure sensor 208. In this exemplary embodiment, the pressure sensor 208 is designed as an external pressure sensor 209. The external pressure sensor 209 is connected via a signal line 210 to a pressure sensor connection 206 on the housing 2 of the trailer control module 1.

The parking brake signal input 200 is connected to the pressure sensor connection 206, such that the parking brake signal input 200 can receive a signal from the external pressure sensor 209. The external pressure sensor 209 preferably detects the pressure at an immobilizing brake, in particular the pressure at a cylinder 6a of a spring-type actuator 6, in order to thus provide a corresponding pressure signal SD as second brake representation signal SB2 at the pressure sensor connection 206 and thus at the parking brake signal input 200. The external pressure sensor 209 may ultimately be installed anywhere in the tractor vehicle 502. This makes it possible to achieve a particularly simple integration of the trailer control module 1 into an existing tractor vehicle 502, in particular with a conventional pneumatic immobilizing brake. It is merely necessary to run a signal line from an existing external pressure sensor 209 to the pressure sensor connection 206, such that the brake representation signal SB2 can be provided in the form of the pressure signal SD at the parking brake signal input 200. The further functioning of the trailer control module 1 according to the second example (FIG. 3) is identical to that of the first example (FIG. 2).

The third example (FIG. 4) is a combination of the first and second exemplary embodiments. Whilst the parking brake valve unit 12 in the third example (FIG. 4) is designed correspondingly to the second example (FIG. 2), the parking brake signal input 200 is connected, correspondingly to the first example (FIG. 2), to the second CAN bus connection 202, to which the second CAN bus line 204 is connected, which in turn runs to the central module 527. In this respect, reference is made to the above description relating to FIGS. 2 and 3 in its entirety.

In the fourth and fifth exemplary embodiments (FIGS. 5 and 6), the parking brake signal input 200 is again designed to be connected to a pressure sensor 208. In this case (FIGS. 5 and 6), the pressure sensor 208 is designed as an internal pressure sensor 212. The parking brake signal input 200 is connected to the internal pressure sensor 212 via an internal interface 214. The internal pressure sensor 212 is connected via a measurement line 216 to the pneumatic control line 83, in which the control pressure P3 is output via the parking brake pressure input 43. That is to say, the internal pressure sensor 212 detects the parking brake pressure output at the parking brake pressure input 43, which parking brake pressure corresponds to the brake pressure in the immobilizing brakes, in particular the spring-type actuators 6, or to an equivalent pressure of a pilot-control unit for the immobilizing brakes, or to the pressure output by a parking brake valve at the trailer port. The internal pressure sensor 212 provides, at the internal interface 214, a pressure signal SDI, which is provided at the parking brake signal input 200 as third brake representation signal SB3. The pressure signal SDI thus forms the brake representation signal SB3 according to the fourth and fifth exemplary embodiments.

The remaining functioning of the trailer control module 1 according to the fourth and fifth exemplary embodiments is identical to the first three exemplary embodiments. It is again a trailer control module 1 for "European trailer control", and in this respect the trailer control module has the parking brake valve unit 12.

Whilst the parking brake valve unit 12 according to the fourth example (FIG. 5) is designed correspondingly to the second and third exemplary embodiments (FIGS. 3 and 4), the parking brake valve unit 12 in the fifth example (FIG. 6) is designed correspondingly to the first example (FIG. 2). That is to say, in the fourth example (FIG. 5), the control pressure P4 is output via the shuttle valve 18, whilst in the fifth example (FIG. 6), the control pressure P4 is output directly via the 3/2 directional valve 14.

Figure 6:
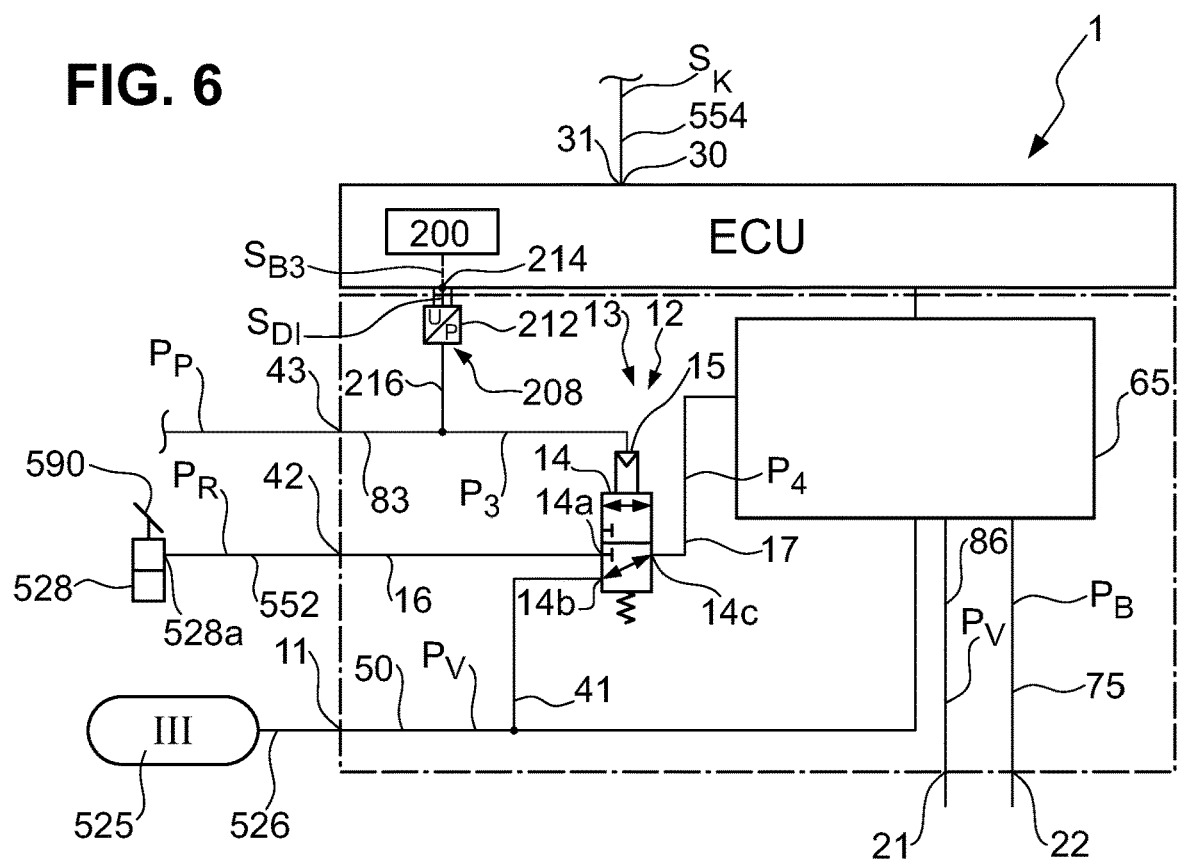
FIG. 6 shows a fifth example of the electropneumatic trailer control module.
Figure 7:
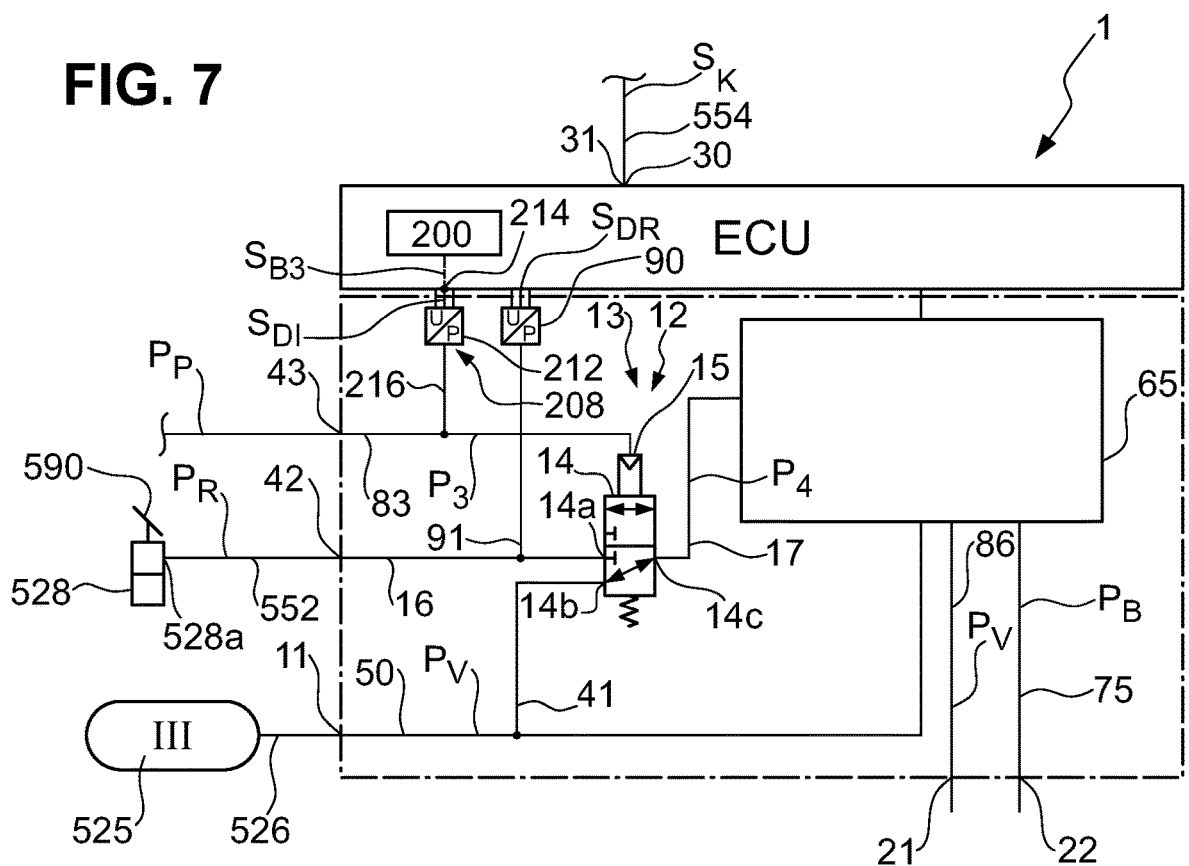
FIG. 7 shows a sixth example of the electropneumatic trailer control module.
Figure 8:
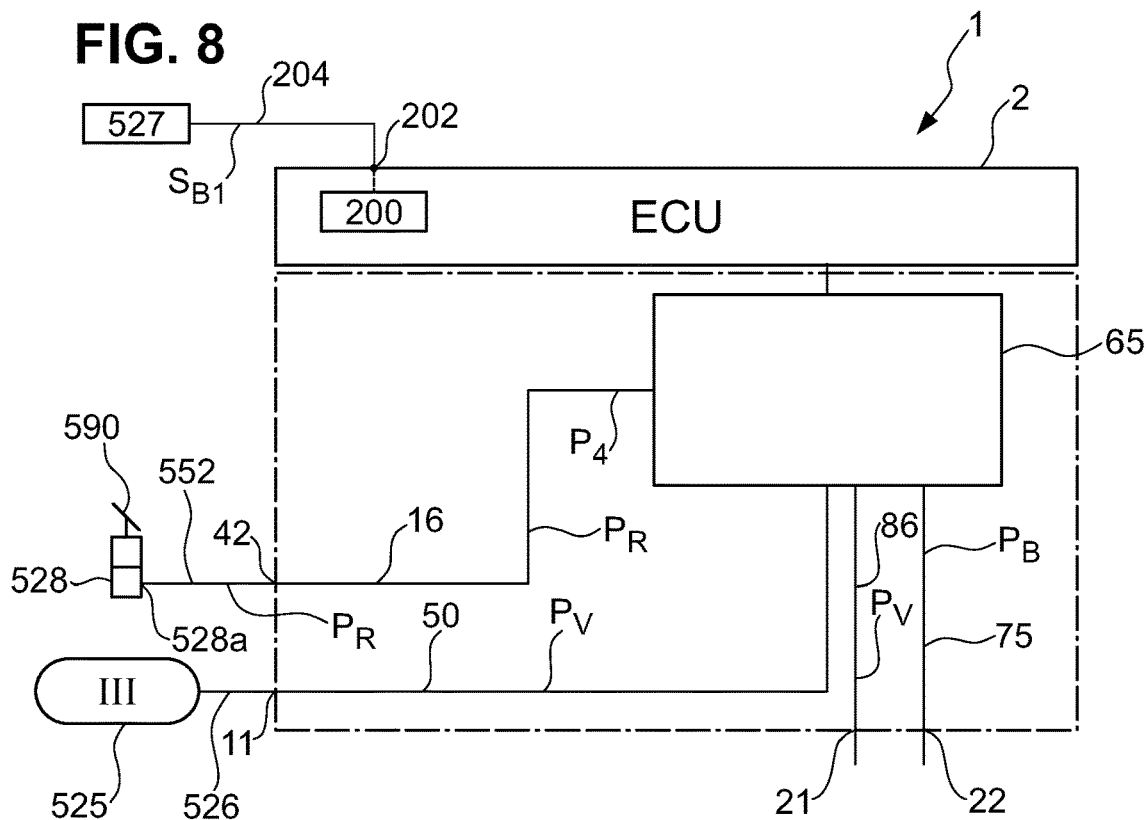
FIG. 8 shows a seventh example of the electropneumatic trailer control module.
Figure 9:
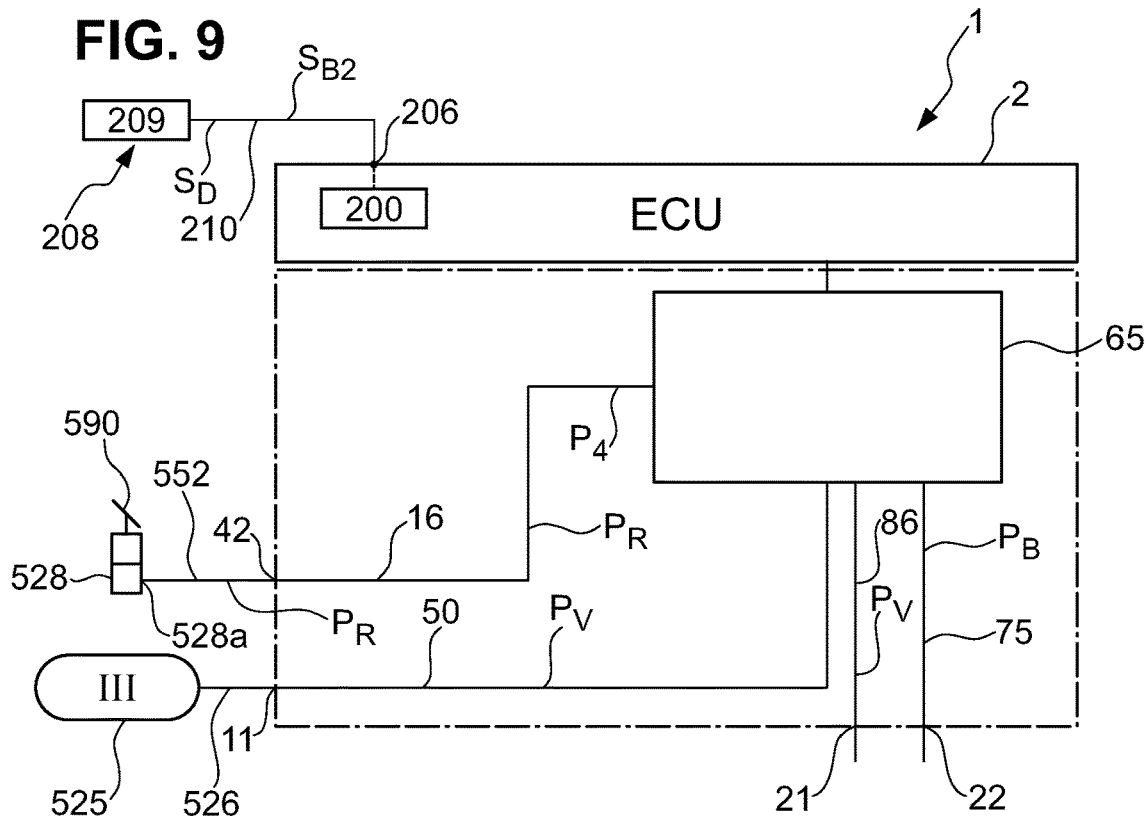
FIG. 9 shows an eighth example of the electropneumatic trailer control module.

FIG. 7 now illustrates a sixth exemplary embodiment, which basically builds on the fifth example (FIG. 6). Identical and similar elements are denoted by the same reference designations, and in this respect reference is made to the above description in its entirety.

The only difference between the previous exemplary embodiments lies in a redundant pressure sensor 90. The redundant pressure sensor 90 is connected via a redundancy pressure measurement line 91 to the first redundancy pressure line 16. Consequently, the redundant pressure sensor 90 measures the redundancy pressure PR in the first redundancy pressure line 16, which is output manually at the redundancy pressure port 42 by actuation of the brake pedal 590. With reference to the preceding exemplary embodiments, it has already been described how the manually output redundancy pressure PR leads, via the first redundancy pressure line 16, possibly the shuttle valve 18, the second redundancy pressure line 17, the redundancy valve RV, the redundancy pressure control line 81 and the relay valve 20 (see FIG. 2), to a brake pressure PB output at the trailer brake pressure port 22.

The redundant pressure sensor 90 can be utilized for identifying a driver interaction in the case of autonomous control of the brake system 520. The redundant pressure sensor 90 measures the manually output redundancy pressure PR and provides a corresponding redundancy pressure signal SDR at the control unit ECU.

The redundancy pressure signal SPR provided by the redundant pressure sensor 90 represents a driver demand, because the redundant pressure sensor 90 detects the redundancy pressure PR output manually by the brake transducer 528. The control unit ECU is preferably configured to compare the redundancy pressure signal SDR, which it receives from the pressure sensor 90, with an autonomously output service brake signal, which it receives for example from the control unit 536 for autonomous driving. If the pressure signal SDR represents a greater deceleration demand than the service brake signal received from the control unit 536, the control unit ECU triggers the switching of the redundancy valve RV in order to permit the manual outputting of a brake pressure PB at the trailer brake pressure port 22 on the basis of the redundancy pressure PR. In other words, if the driver demands a more intense deceleration than the control unit 536 for autonomous driving, the control unit 536 is locked out, and the driver takes over manually.

Exemplary embodiments seven, eight, nine and ten (FIGS. 8, 9, 10, 11) now each show a trailer control module 1 for "Scandinavian trailer control". Exemplary embodiments seven, eight, nine and ten therefore differ from the previous exemplary embodiments substantially in that they do not have a parking brake valve unit 12, because in the case of "Scandinavian trailer control", the outputting of a brake pressure PB at the trailer brake pressure port 22 should be performed only temporarily in the event of the immobilizing brakes of the tractor vehicle 502 being engaged, and the service brakes of the trailer are subsequently released again in the parking position.

According to the seventh example (FIG. 8), the parking brake signal input 200 of the trailer control module 1 is configured to receive the brake representation signal SB1 from the central module 527. In this respect, reference is made to the above description relating to exemplary embodiments 1 and 3, in which the parking brake signal input 200 is designed correspondingly, in its entirety. In a preferred variant, the electropneumatic trailer control module 1 can also receive the brake representation signal SB1 directly from the electronic control unit of the immobilizing brake unit 541 via the third CAN bus 555 and the CAN bus connection 202*a* (see FIG. 1).

According to the eighth example (FIG. 9), the parking brake signal input 200 is designed to receive a pressure signal SD as brake representation signal SB2 from a pressure sensor 208, in this case an external pressure sensor 209. In this respect, reference is made to the above description relating to the second example (FIG. 3), in which the parking brake signal input 200 is designed correspondingly, in its entirety.

The ninth example (FIG. 10) is in turn based on the seventh example (FIG. 8) but, like the sixth example (FIG. 7), comprises a redundant pressure sensor 90. For the detailed description of the redundant pressure sensor 90, reference is made to the above description relating to the sixth example (FIG. 7).

According to the tenth example (FIG. 11), the parking brake signal input 200 is designed to receive the brake representation signal SB3 as pressure signal SDI from a pressure sensor 208, in this case an internal pressure sensor 212. In this respect, reference is made to the above description relating to the fourth and fifth exemplary embodiments (FIGS. 5 and 6), in which the parking brake signal input 200 is designed correspondingly, in its entirety.

Figure 12:
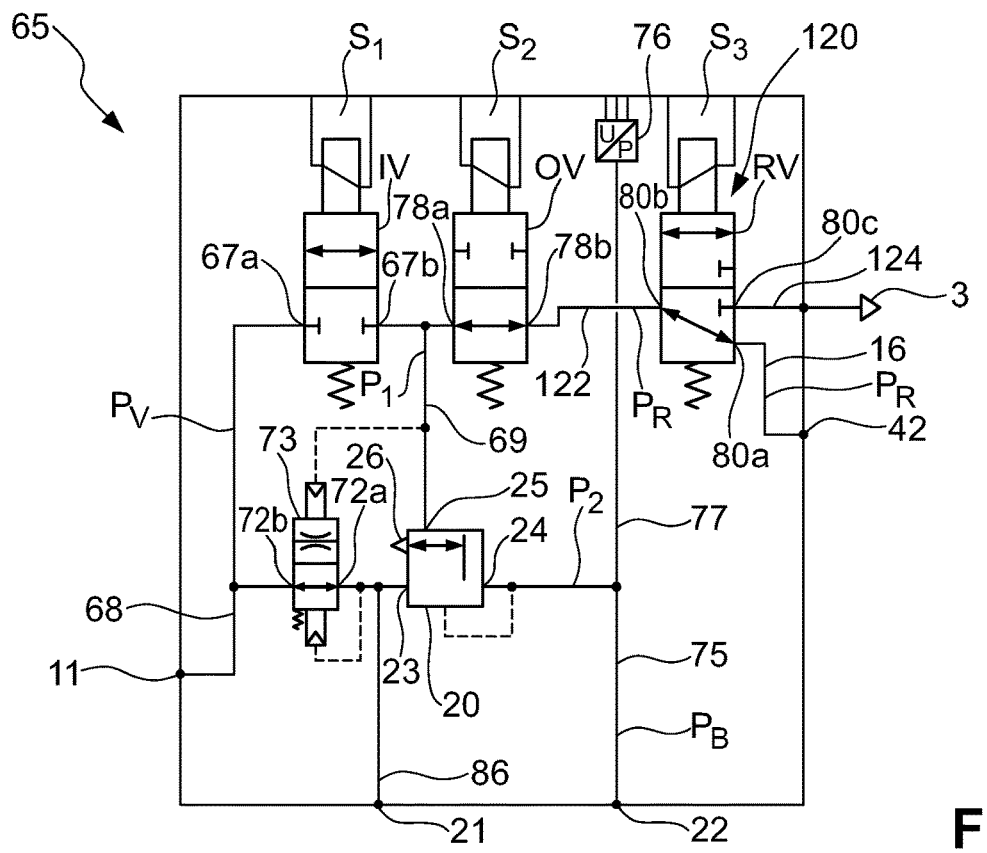
FIG. 12 shows a variant of the trailer control valve unit.
Figure 13:
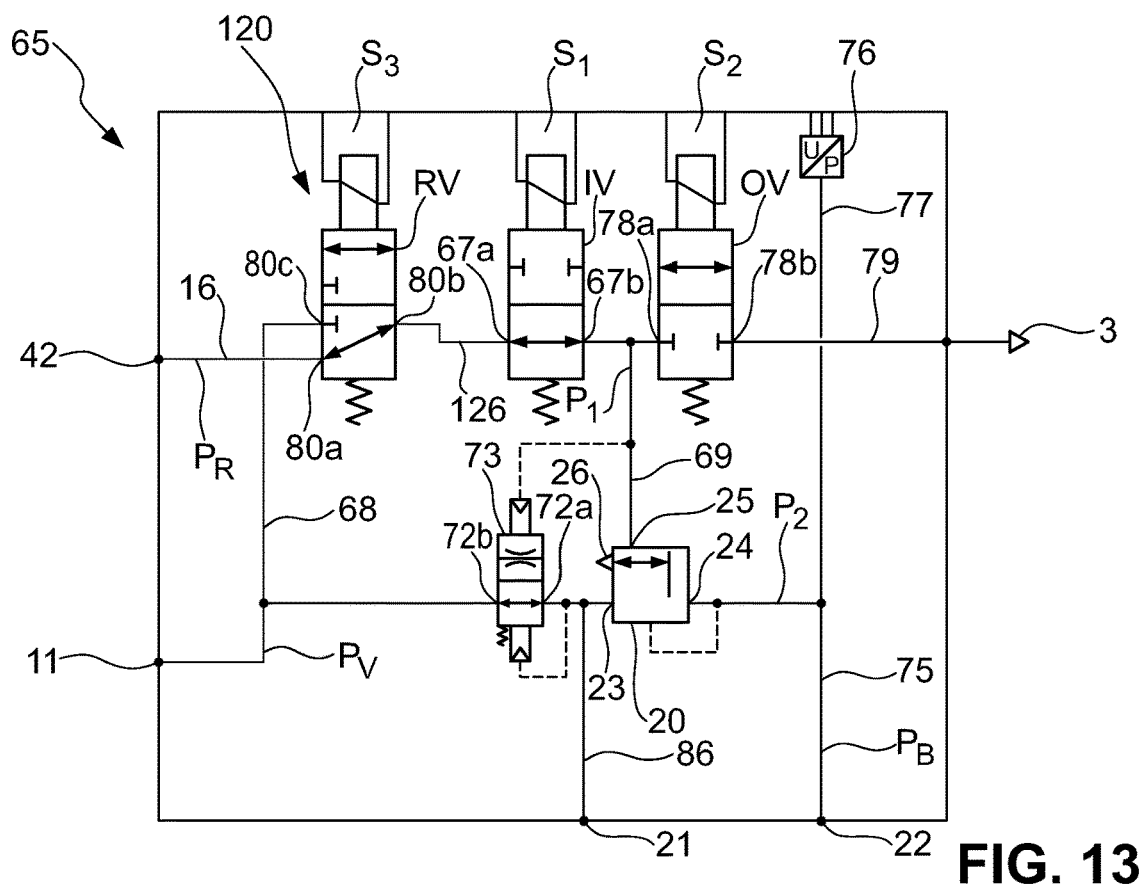
FIG. 13 shows a further variant of the trailer control valve unit.

FIGS. 12 and 13 now illustrate further variants of the trailer control valve unit 65, and it can be seen that the trailer control valve unit 65 as per FIGS. 12 and 13 can in each case replace those of FIGS. 2 to 11.

Both in the first variant (FIG. 12) and in the second variant (FIG. 13), a major difference in relation to the first example (FIG. 2) is that the redundancy valve RV is designed as a 3/2 directional valve 120.

With regard to the first variant (FIG. 12), the major difference lies in the interconnection of the redundancy valve RV, which is designed as a 3/2 directional valve 120. A further difference lies in the reversal of the outlet valve OV, which is reversed in terms of the switching positions such that it is open when electrically deenergized, as in the switching position shown in FIG. 10. By contrast to the first example (FIG. 2), the outlet valve is, by way of its second outlet valve port 78*b*, connected not directly to the pressure sink 3 but rather to a first connecting line 122, which connects the second outlet valve port 78*b* to the second redundancy valve port 80*b*. The third redundancy valve port 80*c* of the 3/2 directional valve 120 is connected via a further ventilation branch line 124 to the pressure sink 3.

The mode of operation of this layout is as follows: during normal driving operation, the outlet valve OV is switched, on the basis of a signal S2 provided by the control unit ECU, into the second, closed switching position (not shown). By switching of the inlet valve IV on the basis of the signal S1 of the electronic control unit ECU, it is then possible for a service brake control pressure P1 to be output at the relay valve control input 25 of the relay valve 20, and, on the basis of this in turn, for a relay working pressure P2 to be output at the relay valve output 24. During normal driving operation, the redundancy valve RV is also in the second switching position (not shown) on the basis of a signal S3. In the electrically deenergized state (as shown in FIG. 12), the first redundancy valve port 80*a* is connected to the second redundancy valve port 80*b*, such that the redundancy pressure PR can be output in the first connecting line 122. During normal driving operation, it is however preferable for the redundancy pressure PR to be locked out, and the signal S3 is thus applied in order to move the redundancy valve RV into the second switching position (not shown). In this second switching position (not shown), the second redundancy valve port 80*b* is connected to the third redundancy valve port 80*c*. That is to say, in the second switching position (not shown) of the redundancy valve RV, the pressure sink 3 is connected to the second outlet valve port 78*b*. Consequently, by corresponding switching of the outlet valve OV, the relay valve control input 25 can be ventilated into the electrically deenergized position, so as not to output a brake pressure PB at the trailer brake pressure port 22.

The advantage of this switching is evident in the event of a fault, if a signal can no longer be output by the electronic control unit ECU. In this case, the inlet valve IV, the outlet valve OV and the redundancy valve RV are each situated in the electrically deenergized state shown in FIG. 12. In this state, the reservoir pressure PV is locked out by the inlet valve IV, and the redundancy pressure PR prevails at the relay valve control input 25 of the relay valve 20. Thus, even in the event of a failure of the electronic control unit ECU, a vehicle driver can redundantly output a brake pressure PB at the trailer brake pressure port 22 via the brake transducer 528 and safely brake the vehicle combination 500.

A second variant is shown in FIG. 13. It is also the case in the variant of the trailer control valve unit 65 shown in FIG. 13 that the redundancy valve RV is designed as a 3/2 directional valve 120. The first redundancy valve port 80*a* is in turn connected via the first redundancy pressure line 16 to the redundancy pressure port 42. The second redundancy valve port 80*b* is, as is also the case in the first example (FIG. 2), connected to a pneumatic line, in this case a second connecting line 126. By contrast to the first exemplary embodiment, the third redundancy valve port 80*c* is connected to the first reservoir pressure branch line 68. The second connecting line 126 is furthermore connected to the first inlet valve port 67*a*, and the second inlet valve port 67*b* is, as is also the case in the first exemplary embodiment, connected to the first control line 69.

The mode of operation of this circuit layout is as follows: In the electrically deenergized state, that is to say in the absence of signal S3, the redundancy valve RV is situated in the first switching position shown in FIG. 13. In this first, electrically deenergized switching position, the first redundancy valve port 80*a* is connected to the second redundancy valve port 80*b*. Thus, in the electrically deenergized position, a redundancy pressure PR can be output at the second connecting line 126. During normal driving operation, however, a signal S3 is switched, such that the third redundancy valve port 80*c* is connected to the second redundancy valve port 80*b*, and the reservoir pressure PV is output at the second connecting line 126.

The inlet valve IV is in an electrically deenergized open state and in the first switching position (shown in FIG. 13), and the outlet valve OV is in the electrically deenergized closed state and in the first switching position (shown in FIG. 13). During normal driving operation, the inlet valve IV is closed, and a signal S1 is applied. If the inlet valve IV is now opened, the service brake control pressure P1 from the reservoir input 11 can be output at the relay valve control input 25 via the first reservoir branch line 68, the third redundancy valve port 80*c*, the second redundancy valve port 80*b*, the second connecting line 126, the first inlet valve port 67*a*, the second inlet valve port 67*b* and the first control line 69, whereby, in turn, a brake pressure PB is output at the trailer brake pressure port 22. For the ventilation of the relay valve control input 25, a signal S2 is then transmitted by the electronic control unit ECU to the outlet valve OV, such that the latter is switched into the second switching position (open switching position), whereas the inlet valve IV is, via a signal S1, moved into the closed, second switching position. Consequently, the relay valve control input 25 is connected via the first control line 69, the first outlet valve port 78*a*, the second outlet valve port 78*b* and the ventilation branch line 79 to the pressure sink 3, and can be ventilated. The brake pressure PB decreases again.

In this layout, too, the position of the valves RV, IV, OV is selected such that, in the event that the control unit ECU fails, a redundancy pressure PR at the redundancy pressure port 42 has the effect that a brake pressure PB is output at the trailer brake pressure port 22. In the electrically deenergized state, the redundancy valve RV connects the redundancy pressure port 42 to the second connecting line 126. The inlet valve IV is in the electrically deenergized open state, and the redundancy pressure PR can pass via the inlet valve IV into the first control line 69. The outlet valve OV is in the electrically deenergized closed state, and shuts off the first control line 69 with respect to the pressure sink 3. Thus, in this case, the redundancy pressure PR prevails at the relay valve control input 25, and a brake pressure PB can be output at the trailer brake pressure port 22.

Figure 14:
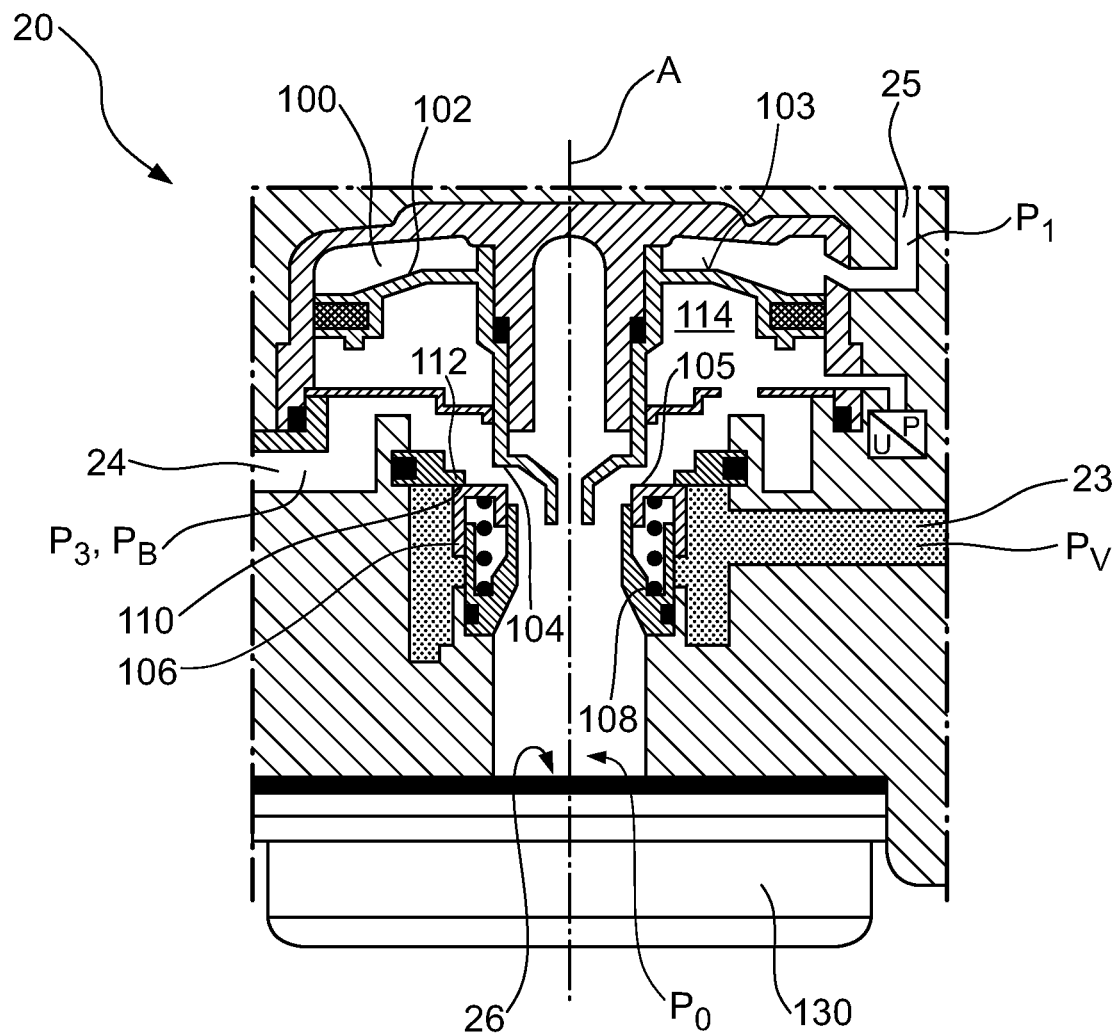
FIG. 14 is a schematic illustration of a relay valve.

Furthermore, by contrast to the situation known in the prior art, the relay valve 20 is formed with one common control chamber 100, in this example only one single control chamber 100 (see FIG. 14). As has already been discussed with reference to FIG. 2, the relay valve 20 has a relay valve control input 25, the relay valve working input 23 to which the second reservoir pressure branch line 71 of the reservoir pressure distribution line 50 is connected and at which the pressure PV prevails, a relay valve output 24, which is connected via the trailer brake pressure line 75 to the trailer brake pressure port 22 and via which the relay working pressure P2 or the brake pressure PB can be output, and a relay valve ventilation output 26, via which the relay valve output 24 can be ventilated and which is connected to the pressure sink 3. A pressure P0 consequently prevails at the relay valve ventilation output 26, which pressure corresponds to the pressure of the pressure sink 3, in particular of the surroundings.

As can be seen from FIG. 14, the relay valve 20 has a common control chamber 100, into which the single relay valve control input 25 opens. Provision may be made for further control inputs to open into the control chamber 100. Via the relay valve control input 25, both the service brake control pressure P1 and redundancy pressure PR can be output into the common control chamber 100; in this respect, only one common control chamber 100 is provided for the two control pressures P1, PR. The control chamber 100 thus performs two functions: First, via the control chamber 100, the brake pressure PB can be output in a manner dependent on the service brake control pressure P1, and second, via the control chamber 100, the brake pressure PB can also be output in a manner dependent on the redundancy pressure PR.

The control chamber 100 acts on a single control piston 102. The single control piston 102 is guided so as to slide axially along an axis A. When the relay valve control input 25 is aerated with the control pressure P3, the control piston 102 can move downward in relation to FIG. 14 and, via a valve seat 104, makes contact with a corresponding slide ring 106, which is pushed in spring-loaded fashion into the axially upper position. A spiral spring 108 is provided for this purpose. The slide ring 106 has a second valve seat 110, which seals against a projection 112 and thus initially holds the relay valve working input 23 closed.

The control piston is shown in an open position in FIG. 14. In its shut-off position, the valve seat 104 is in contact with the slide ring 106. In the shut-off position, both the relay valve working input 23 and the relay valve output 24 are closed off with respect to the relay valve ventilation output 26.

Owing to the output control pressure P3, a force acts on the control piston 102, which force leads to the opening of the second valve seat 110, such that the pressure PV can pass over into the working space 114. The pressure in the working space 114 increases and leads to an opposing force on the control piston 102, such that the control piston moves back into the shut-off position. A brake pressure PB is correspondingly output at the relay valve output 24, and is held there.

Figure 15:
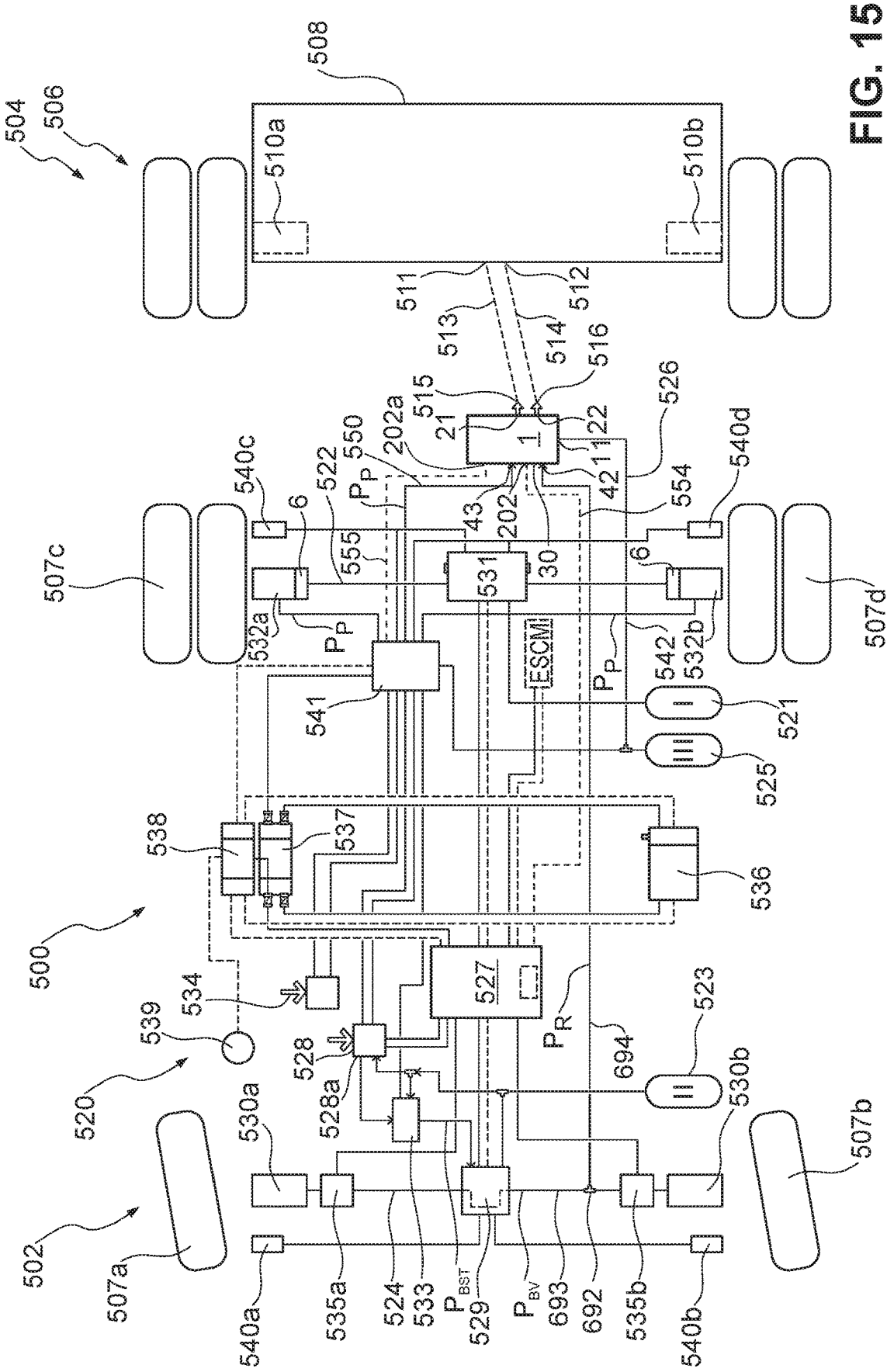
FIG. 15 shows a schematic overall layout of a brake system for a vehicle combination with an electropneumatic trailer control module according to the invention according to an eleventh exemplary embodiment.

FIG. 15 now shows an eleventh exemplary embodiment. The brake system 520 shown in FIG. 15 is basically similar to that according to FIG. 1, and identical and similar elements are denoted by the same reference designations. In this respect, reference is made to the above description of FIG. 1 in its entirety. Therefore, substantially the differences will be discussed below. The difference lies in the interconnection in the layout of the brake system 520; this change has little or no effect on the electropneumatic trailer control module 1.

By contrast to the first example of FIG. 1, the redundancy port 42 is not jointly connected via the redundancy pressure feed line 552 to the bypass 553 and, via the latter, to the brake transducer 528; rather, the brake pressure of another vehicle axle, in this example the front axle brake pressure PBV, is output at the redundancy port 42. For this purpose, a third redundancy pressure feed line 694 is provided, which is connected via a T-piece 692 to a front-axle brake pressure line 693. Via this third redundancy pressure feed line 694, the front-axle brake pressure PBV of the service brakes 530*a*, 530*b* of the front axle is output at the redundancy pressure port 42.

The brake transducer 528 is then, by contrast to the first example (FIG. 1), connected only to the bypass 533 and, via the latter, connected to the front-axle modulator 529, in order to redundantly output the brake transducer control pressure PBST at the front-axle modulator 529. If both the electropneumatic trailer control module 1 is electrically deenergized owing to a fault and the front-axle modulator 529 is electrically deenergized owing to the fault or another fault, it is possible in this way for the brake transducer control pressure PBST that is output manually by the foot-operated pedal 590 to be output via the front-axle modulator 529 as redundancy pressure PR at the redundancy pressure port 42 of the electropneumatic control module 1.

While the above description constitutes the preferred embodiments of the present invention, it will be appreciated that the invention is susceptible to modification, variation and change without departing from the proper scope and fair meaning of the accompanying claims.

The invention claimed is:

1. An electropneumatic trailer control module (1) for an electronically controllable pneumatic brake system (520) for a vehicle combination (500) with a tractor vehicle (502) and a trailer vehicle (504), the electropneumatic trailer control module (1) comprising:
    an electronic control unit (ECU),
    a pneumatic reservoir input (11), which is connectable to a compressed-air reservoir (525),
    a trailer control valve unit (65) with one or more electropneumatic valves (RV, IV, OV),
    a trailer brake pressure port (22), and a trailer supply pressure port (21), wherein the electronic control unit (ECU) has a parking brake signal input (200) and receives an electronic brake representation signal (SB1, SB2, SB3) representing an actuation of an immobilizing brake (6, 532*a*, 532*b*) of the tractor vehicle (502), wherein the electronic control unit (ECU) switches at least one valve (IV) of the one or more electropneumatic valves (RV, IV, OV) of the trailer control valve unit (65) based on the received brake representation signal (SB1, SB2, SB3) and outputs a brake pressure (PB) at the trailer brake pressure port (22), and further comprising a relay valve (20) including a relay valve working input (23) connected to the reservoir input (11), a relay valve output (24) connected to the trailer brake pressure port (22), and a relay valve control input (25) opening into a common inner control chamber (100), wherein the relay valve selectively directs a service brake control pressure (P1) or a redundancy pressure (PR) into the common inner control chamber (100).

2. The electropneumatic trailer control module (1) as claimed in claim 1, wherein the trailer control valve unit (65) has at least one inlet valve (IV) with a first inlet valve port (67*a*) and with a second inlet valve port (67*b*), wherein the first inlet valve port (67*a*) is connected to the reservoir input (11) and the electronic control unit (ECU) switches the inlet valve (IV) based on the received brake representation signal (SB1, SB2, SB3) and outputs the brake pressure (PB) at the trailer brake pressure port (22).

3. The electropneumatic trailer control module (1) as claimed in claim 1, wherein the electronic control unit (ECU) receives the brake representation signal (SB1) from a further control unit.

4. The electropneumatic trailer control module (1) as claimed in claim 3, wherein the further control unit is an electronic control unit of an immobilizing brake unit (541) providing an immobilizing brake pressure to the immobilizing brake (6, 532*a*, 532*b*) of the tractor vehicle (502).

5. The electropneumatic trailer control module (1) as claimed in claim 3, wherein the further control unit is a central module (527).

6. The electropneumatic trailer control module (1) as claimed in claim 1, wherein the parking brake signal input (200) is connected to a pressure sensor (208, 209, 212), and wherein the electronic control unit (ECU) receives the electronic brake representation signal (SB2, SB3) from the pressure sensor (208, 209, 212).

7. The electropneumatic trailer control module (1) as claimed in claim 6, further comprising a parking brake pressure input (43) that receives an immobilizing brake pressure (PP) of the immobilizing brake (6, 532*a*, 532*b*) of the tractor vehicle (502).

8. The electropneumatic trailer control module (1) as claimed in claim 7, wherein the pressure sensor (208, 212) detects the immobilizing brake pressure (PP) at the parking brake pressure input (43) and is connected to the parking brake signal input (200) and provides an electronic pressure signal (SDi) as a brake representation signal (SB3) at the electronic control unit (ECU).

9. The AR electropneumatic trailer control module (1) as claimed in claim 1,
wherein the parking brake signal input (200) is connected to a pressure sensor (208, 209, 212), and wherein the electronic control unit (ECU) receives the electronic brake representation signal (SB2, SB3) from the pressure sensor (208, 209, 212), and further comprising a parking brake valve unit (12), having a pneumatically controlled switching valve (13) which has a pneumatic control input (15) that receives a pneumatic control pressure (P3), wherein, when the parking brake pressure input (43) is ventilated, the pneumatically controlled switching valve (13) is switched and directs the brake pressure (PB) to the trailer brake pressure port (22).

10. The electropneumatic trailer control module as claimed in claim 9, wherein the pneumatic control pressure (P3) is an immobilizing brake pressure (PP) of the immobilizing brake (6, 532*a*, 532*b*) or a trailer parking brake pressure of a parking brake valve.

11. The electropneumatic trailer control module as claimed in claim 9, wherein the pneumatic control pressure (P3) is an immobilizing brake control pressure in an upstream pilot-control unit of an immobilizing brake unit (541) providing an immobilizing brake pressure to the immobilizing brake (6, 532*a*, 532*b*) of the tractor vehicle (502).

12. The electropneumatic trailer control module (1) as claimed in claim 9, further comprising a redundancy pressure port (42) with a first redundancy pressure line (16), and wherein the pneumatically controlled switching valve (13) is connected to a second redundancy pressure line (17), to which the first redundancy pressure line (16) is also connected, such that, when the pneumatically controlled switching valve (13) is switched, a pressure is directed to the second redundancy pressure line (17).

13. The electropneumatic trailer control module (1) as claimed in claim 12, wherein a pneumatic control output (528*a*) of a brake transducer (528) is connected to the redundancy pressure port (42).

14. The electropneumatic trailer control module (1) as claimed in claim 12, wherein a third redundancy pressure line (694) is connected to the redundancy pressure port (42) to output a service brake pressure (PBV) at the redundancy pressure port (42).

15. The electropneumatic trailer control module (1) as claimed in claim 12, wherein the pneumatically controlled switching valve (13) is a 3/2 directional valve (14) with a first port (14*a*), a second port (14*b*) and a third port (14*c*).

16. The electropneumatic trailer control module (1) as claimed in claim 15, wherein the second port (14*b*) is connected to the reservoir input (11) and the first port (14*a*) is connected to the redundancy pressure port (42).

17. The electropneumatic trailer control module (1) as claimed in claim 15, wherein the first port (14*a*) of the pneumatically controlled 3/2 directional valve (14) is connected to a pressure sink (3).

18. The electropneumatic trailer control module (1) as claimed in claim 15, wherein the third port (14*c*) of the pneumatically controlled switching valve (13) is connected to a first shuttle valve input (18*a*) of a shuttle valve (18), wherein a second shuttle valve input (18*b*) of the shuttle valve (18) is connected to the redundancy pressure port (42), and a shuttle valve output (18*c*) of the shuttle valve (18) is connected to the second redundancy pressure line (17).

19. The electropneumatic trailer control module (1) as claimed in claim 18, wherein the shuttle valve (18) is a select-high check valve (19) with the first and second shuttle valve inputs (18*a*, 18(*b*)) and the shuttle valve output (18*c*).

20. The electropneumatic trailer control module (1) as claimed in claim 1, wherein the common inner control chamber (100) of the relay valve (20) is delimited by a single control piston (102).

21. The electropneumatic trailer control module (1) as claimed in claim 1, wherein the common inner control chamber (100) is connected to the reservoir input (11) via an electronically switchable inlet valve (IV).

22. The electropneumatic trailer control module (1) as claimed in claim 1, wherein the common inner control chamber (100) is connected to a first redundancy pressure line (16).

23. The electropneumatic trailer control module (1) as claimed in claim 1, further comprising a connection (250) that receives a redundant electronic brake representation signal (SB4), wherein the electronic control unit (ECU) switches at least one valve (IV) of the trailer control valve unit (65) based on the received redundant electronic brake representation signal and outputs (SB4) a corresponding brake pressure (PB) at the trailer brake pressure port (22).

24. The electropneumatic trailer control module (1) as claimed in claim 23, further comprising a redundant pressure sensor (90), which is arranged on a redundancy pressure line (16) or at the redundancy pressure port (42) and which detects the pneumatic pressure (PR) at the redundancy pressure port (42) and provides a signal (SPR) representing the pneumatic pressure detected at the redundancy pressure port (42) as the redundant electronic brake representation signal (SB4) at the electronic control unit (ECU).

25. A vehicle (500) comprising an electropneumatic trailer control module (1) as claimed in claim 1.

26. The electropneumatic trailer control module (1) as claimed in claim 1, wherein the electronic brake representation signal is received from a separate brake system component outside of the electronic control unit, wherein the separate brake system component provides the electronic brake representation signal to the parking brake signal input of the electronic control unit.

27. An electropneumatic trailer control module (1) for an electronically controllable pneumatic brake system (520) for a vehicle combination (500) with a tractor vehicle (502) and a trailer vehicle (504), the electropneumatic trailer control module (1) comprising:
an electronic control unit (ECU),
a pneumatic reservoir input (11), which is connectable to a compressed-air reservoir (525),
a trailer control valve unit (65) with one or more electropneumatic valves (RV, IV, OV),
a trailer brake pressure port (22), and a trailer supply pressure port (21),
wherein the electronic control unit (ECU) has a parking brake signal input (200) and receives an electronic brake representation signal (SB1, SB2, SB3) representing an actuation of an immobilizing brake (6, 532a, 532b) of the tractor vehicle (502), wherein
the electronic control unit (ECU) switches at least one valve (IV) of the one or more electropneumatic valves (RV, IV, OV) of the trailer control valve unit (65) based on the received brake representation signal (SB1, SB2, SB3) and outputs a brake pressure (PB) at the trailer brake pressure port (22), and
further comprising an input (31) on the electronic control unit (ECU) that receives a trailer monitoring setting signal (SK).

28. The electropneumatic trailer control module (1) as claimed in claim 27, wherein the electronic control unit (ECU) receives the trailer monitoring setting signal (SK) in digital or analog form via a CAN bus (554).

29. The electropneumatic trailer control module (1) as claimed in claim 27, wherein, upon receiving the trailer monitoring setting signal (SK), the electronic control unit (ECU) switches at least one of the at least one electropneumatic valve (RV, IV, OV) of the trailer control valve unit (65) and ventilates the trailer brake pressure port (22).

30. An electropneumatic trailer control module (1) for an electronically controllable pneumatic brake system (520) for a vehicle combination (500) with a tractor vehicle (502) and a trailer vehicle (504), the electropneumatic trailer control module (1) comprising:
an electronic control unit (ECU),
a pneumatic reservoir input (11), which is connectable to a compressed-air reservoir (525),
a trailer control valve unit (65) with one or more electropneumatic valves (RV, IV, OV),
a trailer brake pressure port (22), and a trailer supply pressure port (21),
wherein the electronic control unit (ECU) has a parking brake signal input (200) and receives an electronic brake representation signal (SB1, SB2, SB3) representing an actuation of an immobilizing brake (6, 532a, 532b) of the tractor vehicle (502), wherein
the electronic control unit (ECU) switches at least one valve (IV) of the one or more electropneumatic valves (RV, IV, OV) of the trailer control valve unit (65) based on the received brake representation signal (SB1, SB2, SB3) and outputs a brake pressure (PB) at the trailer brake pressure port (22), and
wherein the parking brake signal input (200) is connected to a pressure sensor (208, 209, 212), and wherein the electronic control unit (ECU) receives the electronic brake representation signal (SB2, SB3) from the pressure sensor (208, 209, 212), and
further comprising a parking brake valve unit (12), having a pneumatically controlled switching valve (13) which has a pneumatic control input (15) that receives a pneumatic control pressure (P3), wherein, when the parking brake pressure input (43) is ventilated, the pneumatically controlled switching valve (13) is switched and directs the brake pressure (PB) to the trailer brake pressure port (22),
further comprising a redundancy pressure port (42) with a first redundancy pressure line (16), and wherein the pneumatically controlled switching valve (13) is connected to a second redundancy pressure line (17), to which the first redundancy pressure line (16) is also connected, such that, when the pneumatically controlled switching valve (13) is switched, a pressure is directed to the second redundancy pressure line (17),
wherein the pneumatically controlled switching valve (13) is a 3/2 directional valve (14) with a first port (14a), a second port (14b) and a third port (14c),
wherein the third port (14c) of the pneumatically controlled switching valve (13) is connected to a first shuttle valve input (18a), wherein a second shuttle valve input (18b) is connected to the redundancy pressure port (42), and a shuttle valve output (18c) is connected to the second redundancy pressure line (17).

* * * * *